US011576069B2

(12) United States Patent
Damnjanovic et al.

(10) Patent No.: US 11,576,069 B2
(45) Date of Patent: Feb. 7, 2023

(54) CELL MEASUREMENT AND REPORTING FOR MOBILITY IN DISTRIBUTED WIRELESS COMMUNICATIONS SYSTEMS

(71) Applicant: QUALCOMM Incorporated, San Diego, CA (US)

(72) Inventors: Jelena Damnjanovic, Del Mar, CA (US); Tao Luo, San Diego, CA (US); Junyi Li, Franklin Park, NJ (US); Aleksandar Damnjanovic, Del Mar, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 61 days.

(21) Appl. No.: 17/177,468

(22) Filed: Feb. 17, 2021

(65) Prior Publication Data

US 2022/0264346 A1 Aug. 18, 2022

(51) Int. Cl.
*H04W 24/10* (2009.01)
*H04W 76/27* (2018.01)
(Continued)

(52) U.S. Cl.
CPC ......... *H04W 24/10* (2013.01); *H04W 72/046* (2013.01); *H04W 72/06* (2013.01); *H04W 72/10* (2013.01); *H04W 76/27* (2018.02)

(58) Field of Classification Search
CPC ... H04W 24/10; H04W 76/27; H04W 72/046; H04W 72/06; H04W 72/10
See application file for complete search history.

(56) References Cited

U.S. PATENT DOCUMENTS

2017/0331670 A1\* 11/2017 Parkvall ............ H04W 52/0274
2018/0279182 A1 9/2018 Sang et al.
(Continued)

FOREIGN PATENT DOCUMENTS

WO  WO-2019013543 A1  1/2019
WO  WO-2020045603 A1  3/2020
(Continued)

OTHER PUBLICATIONS

CMCC : "Discussion on Intra-DU Inter-Cell Mobility", 3GPP Draft, 3GPP TSG-RAN WG3 #97, R3-173142_Discussion on Intra-Du Inter-Cell Mobility, 3rd Generation Partnership Project (3GPP), Mobile Competence Centre, 650, Route Des Lucioles, F-06921, Sophia-Antipolis Cedex, France, vol. Ran WG3 , no. Berlin, Germany, Aug. 21, 2017-Aug. 25, 2017, Aug. 21, 2017 (Aug. 21, 2017), XP051319973, 8 Pages, Retrieved from the Internet: URL:http://www.3gpp.org/ftp/Meetings_3GPP_SYNC/RAN3/Docs/ [retrieved on Aug. 21, 2017] paragraph [001]-paragraph [02.3].
(Continued)

*Primary Examiner* — Mewale A Ambaye
(74) *Attorney, Agent, or Firm* — Holland & Hart LLP

(57) ABSTRACT

Methods, systems, and devices for wireless communications are described that enable a user equipment (UE) in a distributed system to transmit measurement reports for layer 1 (L1) or layer 2 (L2) mobility on a per distributed unit (DU) basis such that each measurement report for L1/L2 mobility contains only measurements of cells that are supported by the same DU. The UE may generate and transmit a DU-specific measurement report to the DU (e.g., via L1/L2 signaling) that includes measurements of cells controlled by the DU. The UE may support various reporting configurations for measurement reporting including per cell, per group of activated cells, or per group of deactivated cells, in each case reporting to the corresponding DU. The UE may (Continued)

also perform joint reporting that includes the measurements of both activated and deactivated cell sets transmitted to the corresponding DU.

28 Claims, 20 Drawing Sheets

(51) Int. Cl.
*H04W 72/04* (2009.01)
*H04W 72/06* (2009.01)
*H04W 72/10* (2009.01)

(56) References Cited

U.S. PATENT DOCUMENTS

| | | | |
|---|---|---|---|
| 2018/0287677 A1* | 10/2018 | Nagaraja | H04B 7/08 |
| 2019/0124533 A1* | 4/2019 | Tenny | H04L 5/0091 |
| 2019/0260544 A1* | 8/2019 | Dou | H04W 72/082 |
| 2019/0387561 A1 | 12/2019 | Paladugu et al. | |
| 2021/0385702 A1* | 12/2021 | Damnjanovic | H04W 36/0061 |
| 2021/0385708 A1* | 12/2021 | Damnjanovic | H04W 36/00835 |

FOREIGN PATENT DOCUMENTS

| | | |
|---|---|---|
| WO | WO-2020062130 A1 | 4/2020 |
| WO | WO-2021248097 A1 | 12/2021 |

OTHER PUBLICATIONS

International Search Report and Written Opinion—PCT/US2022/012520—ISA/EPO—dated May 6, 2022.

Qualcomm Incorporated: "L1/L2 Mobility Overview", 3GPP TSG-RAN WG2 Meeting #114-e, 3GPP Draft, R2-2105354, 3rd Generation Partnership Project (3GPP), Mobile Competence Centre, 650, Route Des Lucioles, F-06921 Sophia-Antipolis Cedex, France, vol. RAN WG2, No. Electronic, May 19, 2021-May 27, 2021, 4 Pages May 11, 2021 (May 11, 2021), XP052006989, Retrieved from the Internet: URL: https://ftp.3gpp.org/tsg_ran/WG2_RL2/TSGR2_114-e/Docs/R2-2105354.zip R2-2105354_L1 L2 Mobility Overview. docx [retrieved on May 11, 2021] paragraph 2, figure 2, 2.2 L1/L2 Inter-Cell Mobility Schemes, figure 2 3 Conclusion, paragraph [02.2].

* cited by examiner

CELL MEASUREMENT AND REPORTING FOR MOBILITY IN DISTRIBUTED WIRELESS COMMUNICATIONS SYSTEMS

FIELD OF TECHNOLOGY

The following relates to wireless communications, including cell measurement and reporting for mobility in distributed wireless communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In a distributed system, a base station may include a central unit (CU) that supports multiple distributed units (DUs), and each DU may support one or more cells for communications with a user equipment (UE). Traditional techniques rely on layer 3 (L3) signaling for UE mobility, which may be time consuming and introduce delays in beam management, and may also involve additional processing and signaling overhead, which may lead to inefficient mobility procedures for a UE.

SUMMARY

The described techniques relate to improved methods, systems, devices, and apparatuses that support cell measurement and reporting for mobility in distributed wireless communications systems. Generally, the described techniques enable a user equipment (UE) in a distributed system to transmit measurement reports for layer 1 (L1) or layer 2 (L2) mobility. The measurement reports may be specific to a distributed unit (DU) of a base station and may be reported on a per DU basis such that each measurement report for L1/L2 mobility contains measurements of cells that are supported by the same DU. For example, a UE may measure a set of cells configured for the UE for L1/L2 mobility (which may be different than cells configured for the UE for L3 mobility techniques), where each of the set of cells is controlled by the same DU. The UE may generate and transmit a DU-specific measurement report to the DU (e.g., via L1/L2 signaling) that controls the set of cells.

In accordance with the DU-specific measurement reports, the UE may support various reporting configurations for measurement reporting including reporting measurements per cell, per group of activated cells, or per group of deactivated cells, in each case reporting to the corresponding DU. The UE may also perform joint reporting that includes the measurements of both activated and deactivated cell sets transmitted to the corresponding DU. L1/L2 reporting may be configured for a group of cells within a DU and there may be multiple groups (and corresponding configurations) active. Reporting parameters such as periodicity and the number of beams or cells may also be configured for reporting by the UE.

A method for wireless communications at a UE is described. The method may include receiving an indication of a cell set configured for the UE, the cell set including a set of multiple cells supported by a set of multiple DUs of a base station, where the cell set includes a set of activated cells for the UE, a set of deactivated cells for the UE, or both, performing, as part of a mobility procedure for the UE, channel measurements for a subset of cells of the cell set, where each of the subset of cells is supported by a DU of the set of multiple DUs, generating a DU-specific measurement report for the DU of the set of multiple DUs based on performing the channel measurements, the DU-specific measurement report consisting of channel measurement results for each of the subset of cells, and transmitting, to the DU of the set of multiple DUs, the DU-specific measurement report.

An apparatus for wireless communications at a UE is described. The apparatus may include a processor, memory coupled with the processor, and instructions stored in the memory. The instructions may be executable by the processor to cause the apparatus to receive an indication of a cell set configured for the UE, the cell set including a set of multiple cells supported by a set of multiple DUs of a base station, where the cell set includes a set of activated cells for the UE, a set of deactivated cells for the UE, or both, perform, as part of a mobility procedure for the UE, channel measurements for a subset of cells of the cell set, where each of the subset of cells is supported by a DU of the set of multiple DUs, generate a DU-specific measurement report for the DU of the set of multiple DUs based on performing the channel measurements, the DU-specific measurement report consisting of channel measurement results for each of the subset of cells, and transmit, to the DU of the set of multiple DUs, the DU-specific measurement report.

Another apparatus for wireless communications at a UE is described. The apparatus may include means for receiving an indication of a cell set configured for the UE, the cell set including a set of multiple cells supported by a set of multiple DUs of a base station, where the cell set includes a set of activated cells for the UE, a set of deactivated cells for the UE, or both, means for performing, as part of a mobility procedure for the UE, channel measurements for a subset of cells of the cell set, where each of the subset of cells is supported by a DU of the set of multiple DUs, means for generating a DU-specific measurement report for the DU of the set of multiple DUs based on performing the channel measurements, the DU-specific measurement report consisting of channel measurement results for each of the subset of cells, and means for transmitting, to the DU of the set of multiple DUs, the DU-specific measurement report.

A non-transitory computer-readable medium storing code for wireless communications at a UE is described. The code may include instructions executable by a processor to receive an indication of a cell set configured for the UE, the cell set including a set of multiple cells supported by a set of multiple DUs of a base station, where the cell set includes a set of activated cells for the UE, a set of deactivated cells for the UE, or both, perform, as part of a mobility procedure for the UE, channel measurements for a subset of cells of the cell set, where each of the subset of cells is supported by a DU of the set of multiple DUs, generate a DU-specific measurement report for the DU of the set of multiple DUs based on performing the channel measurements, the DU-specific measurement report consisting of channel measurement results for each of the subset of cells, and transmit, to the DU of the set of multiple DUs, the DU-specific measurement report.

Some examples of the method, apparatuses, and non-transitory computer-readable medium described herein may further include operations, features, means, or instructions for transmitting, to a second DU of the set of multiple DUs, a second DU-specific measurement report consisting of channel measurement results for a second subset of cells of the cell set based on performing the channel measurements, where each of the second subset of cells may be supported by the second DU.

In some examples of the method, apparatuses, and non-transitory computer-readable medium described herein, transmitting the DU-specific measurement report may include operations, features, means, or instructions for transmitting a first DU-specific measurement report to the DU, the first DU-specific measurement report including channel measurement results for each activated cell supported by the DU from the set of activated cells and transmitting a second DU-specific measurement report to the DU, the second DU-specific measurement report including channel measurement results for each deactivated cell supported by the DU of the set of deactivated cells.

Some examples of the method, apparatuses, and non-transitory computer-readable medium described herein may further include operations, features, means, or instructions for transmitting respective measurement reports for each cell of the subset of cells, each respective measurement report including a respective set of beams for a respective cell ranked according to a priority order.

In some examples of the method, apparatuses, and non-transitory computer-readable medium described herein, transmitting the DU-specific measurement report may include operations, features, means, or instructions for transmitting the DU-specific measurement report for a group of activated cells of the set of activated cells, the DU-specific measurement report including a set of beams for the group of activated cells ranked according to a priority order across the group of activated cells, a respective set of beams for each cell of the group of activated cells ranked according to a respective priority order for each cell, or both.

In some examples of the method, apparatuses, and non-transitory computer-readable medium described herein, transmitting the DU-specific measurement report may include operations, features, means, or instructions for transmitting the DU-specific measurement report for a group of deactivated cells of the set of deactivated cells, the DU-specific measurement report including a set of beams for the group of deactivated cells ranked according to a priority order across the group of deactivated cells, a respective set of beams for each cell of the group of deactivated cells ranked according to a respective priority order for each cell, a cell quality parameter for each of the group of deactivated cells, or any combination thereof.

In some examples of the method, apparatuses, and non-transitory computer-readable medium described herein, transmitting the DU-specific measurement report may include operations, features, means, or instructions for transmitting a joint DU-specific measurement report to the DU, the joint DU-specific measurement report consisting of channel measurement results for a cell group that includes one or more activated cells supported by the DU from the set of activated cells and one or more deactivated cells supported by the DU from the set of deactivated cells.

In some examples of the method, apparatuses, and non-transitory computer-readable medium described herein, the joint DU-specific measurement report includes a set of beams for the cell group ranked according to a priority order across the cell group, a respective set of beams for one or more cells of the cell group ranked according to a respective priority order for each of the one or more cells, a cell quality for one or more cells of the cell group, or any combination thereof.

Some examples of the method, apparatuses, and non-transitory computer-readable medium described herein may further include operations, features, means, or instructions for receiving, from the DU, a control message that indicates the cell group for reporting in the joint DU-specific measurement report, where the cell group corresponds to a first radio resource control (RRC) connection and may be different from a second cell group corresponding to a second RRC connection.

Some examples of the method, apparatuses, and non-transitory computer-readable medium described herein may further include operations, features, means, or instructions for receiving, from the DU, a control message that indicates the subset of cells for reporting in the DU-specific measurement report, where the subset of cells corresponds to a first RRC connection and may be different from a second subset of cells corresponding to a second RRC connection.

Some examples of the method, apparatuses, and non-transitory computer-readable medium described herein may further include operations, features, means, or instructions for receiving, from the DU, a reporting configuration for the DU-specific measurement report, the reporting configuration indicating the subset of cells for reporting, a number of beams for reporting, a number of cells for reporting, a periodicity associated with reporting, a trigger for reporting, or any combination thereof.

In some examples of the method, apparatuses, and non-transitory computer-readable medium described herein, the reporting configuration corresponds to a first type of reporting different from a second configuration that corresponds to a second type of reporting.

In some examples of the method, apparatuses, and non-transitory computer-readable medium described herein, transmitting the DU-specific measurement report may include operations, features, means, or instructions for transmitting the DU-specific measurement report using L1 or L2 signaling.

In some examples of the method, apparatuses, and non-transitory computer-readable medium described herein, performing the channel measurements may include operations, features, means, or instructions for performing L1 or L2 measurements for each cell of the subset of cells.

Some examples of the method, apparatuses, and non-transitory computer-readable medium described herein may further include operations, features, means, or instructions for performing L3 channel measurements for one or more neighboring cells, where the cell set excludes the one or more neighboring cells, transmitting an L3 measurement report including the L3 channel measurements for the one or more neighboring cells, and receiving a configuration message indicating an updated cell set for the UE based on the L3 measurement report, where the updated cell set includes at least one of the one or more neighboring cells.

A method for wireless communications at a DU of a base station is described. The method may include transmitting, to a UE, an indication of a cell set configured for a mobility procedure for the UE, the cell set including a set of multiple cells supported by a set of multiple DUs including the DU, the cell set including a set of activated cells for the UE, a set of deactivated cells for the UE, or both, transmitting, to the UE, a reporting configuration for reporting measurements for the mobility procedure by the UE, the reporting configuration indicating a subset of cells supported by the DU for reporting, and receiving, from the UE, a DU-specific measurement report for the DU that consists of channel measurement results for the subset of cells based on the reporting configuration.

An apparatus for wireless communications at a DU of a base station is described. The apparatus may include a processor, memory coupled with the processor, and instructions stored in the memory. The instructions may be executable by the processor to cause the apparatus to transmit, to a UE, an indication of a cell set configured for a mobility procedure for the UE, the cell set including a set of multiple cells supported by a set of multiple DUs including the DU, the cell set including a set of activated cells for the UE, a set of deactivated cells for the UE, or both, transmit, to the UE, a reporting configuration for reporting measurements for the mobility procedure by the UE, the reporting configuration indicating a subset of cells supported by the DU for reporting, and receive, from the UE, a DU-specific measurement report for the DU that consists of channel measurement results for the subset of cells based on the reporting configuration.

Another apparatus for wireless communications at a DU of a base station is described. The apparatus may include means for transmitting, to a UE, an indication of a cell set configured for a mobility procedure for the UE, the cell set including a set of multiple cells supported by a set of multiple DUs including the DU, the cell set including a set of activated cells for the UE, a set of deactivated cells for the UE, or both, means for transmitting, to the UE, a reporting configuration for reporting measurements for the mobility procedure by the UE, the reporting configuration indicating a subset of cells supported by the DU for reporting, and means for receiving, from the UE, a DU-specific measurement report for the DU that consists of channel measurement results for the subset of cells based on the reporting configuration.

A non-transitory computer-readable medium storing code for wireless communications at a DU of a base station is described. The code may include instructions executable by a processor to transmit, to a UE, an indication of a cell set configured for a mobility procedure for the UE, the cell set including a set of multiple cells supported by a set of multiple DUs including the DU, the cell set including a set of activated cells for the UE, a set of deactivated cells for the UE, or both, transmit, to the UE, a reporting configuration for reporting measurements for the mobility procedure by the UE, the reporting configuration indicating a subset of cells supported by the DU for reporting, and receive, from the UE, a DU-specific measurement report for the DU that consists of channel measurement results for the subset of cells based on the reporting configuration.

In some examples of the method, apparatuses, and non-transitory computer-readable medium described herein, receiving the DU-specific measurement report may include operations, features, means, or instructions for receiving a first DU-specific measurement report including channel measurement results for each activated cell supported by the DU of the set of activated cells and receiving a second DU-specific measurement report including channel measurement results for each deactivated cell supported by the DU of the set of deactivated cells.

Some examples of the method, apparatuses, and non-transitory computer-readable medium described herein may further include operations, features, means, or instructions for receiving respective DU-specific measurement reports for respective cells of the subset of cells supported by the DU, each DU-specific measurement report including a respective set of beams for a respective cell ranked according to a priority order.

In some examples of the method, apparatuses, and non-transitory computer-readable medium described herein, receiving the DU-specific measurement report may include operations, features, means, or instructions for receiving the DU-specific measurement report for a group of activated cells of the set of activated cells, the DU-specific measurement report including a set of beams for the group of activated cells ranked according to a priority order across the group of activated cells, a respective set of beams for each cell of the group of activated cells ranked according to a respective priority order for each cell, or both.

In some examples of the method, apparatuses, and non-transitory computer-readable medium described herein, receiving the DU-specific measurement report may include operations, features, means, or instructions for receiving the DU-specific measurement report for a group of deactivated cells of the set of deactivated cells, the DU-specific measurement report including a set of beams for the group of deactivated cells ranked according to a priority order across the group of deactivated cells, a respective set of beams for each cell of the group of deactivated cells ranked according to a respective priority order for each cell, a cell quality parameter for each of the group of deactivated cells, or any combination thereof.

In some examples of the method, apparatuses, and non-transitory computer-readable medium described herein, receiving the DU-specific measurement report may include operations, features, means, or instructions for receiving a joint DU-specific measurement report from the UE, the joint DU-specific measurement report including channel measurement results for a cell group that includes one or more activated cells supported by the DU from the set of activated cells and one or more deactivated cells supported by the DU from the set of deactivated cells.

In some examples of the method, apparatuses, and non-transitory computer-readable medium described herein, the joint DU-specific measurement report includes a set of beams for the cell group ranked according to a priority order across the cell group, a respective set of beams for one or more cells of the cell group ranked according to a respective priority order for each of the one or more cells, a cell quality for one or more cells of the cell group, or any combination thereof.

Some examples of the method, apparatuses, and non-transitory computer-readable medium described herein may further include operations, features, means, or instructions for transmitting, to the UE, a control message that indicates the subset of cells for reporting in the DU-specific measurement report, where the subset of cells corresponds to a first RRC connection and may be different from a second subset of cells corresponding to a second RRC connection.

In some examples of the method, apparatuses, and non-transitory computer-readable medium described herein, receiving the DU-specific measurement report may include operations, features, means, or instructions for receiving the DU-specific measurement report using L1 or L2 signaling.

Some examples of the method, apparatuses, and non-transitory computer-readable medium described herein may further include operations, features, means, or instructions for receiving, from the UE, an L3 measurement report including a set of L3 channel measurements for one or more neighboring cells of the UE and transmitting a configuration message to the UE indicating an updated cell set for the UE based on the L3 measurement report, where the updated cell set includes at least one of the one or more neighboring cells.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

Figure 1:
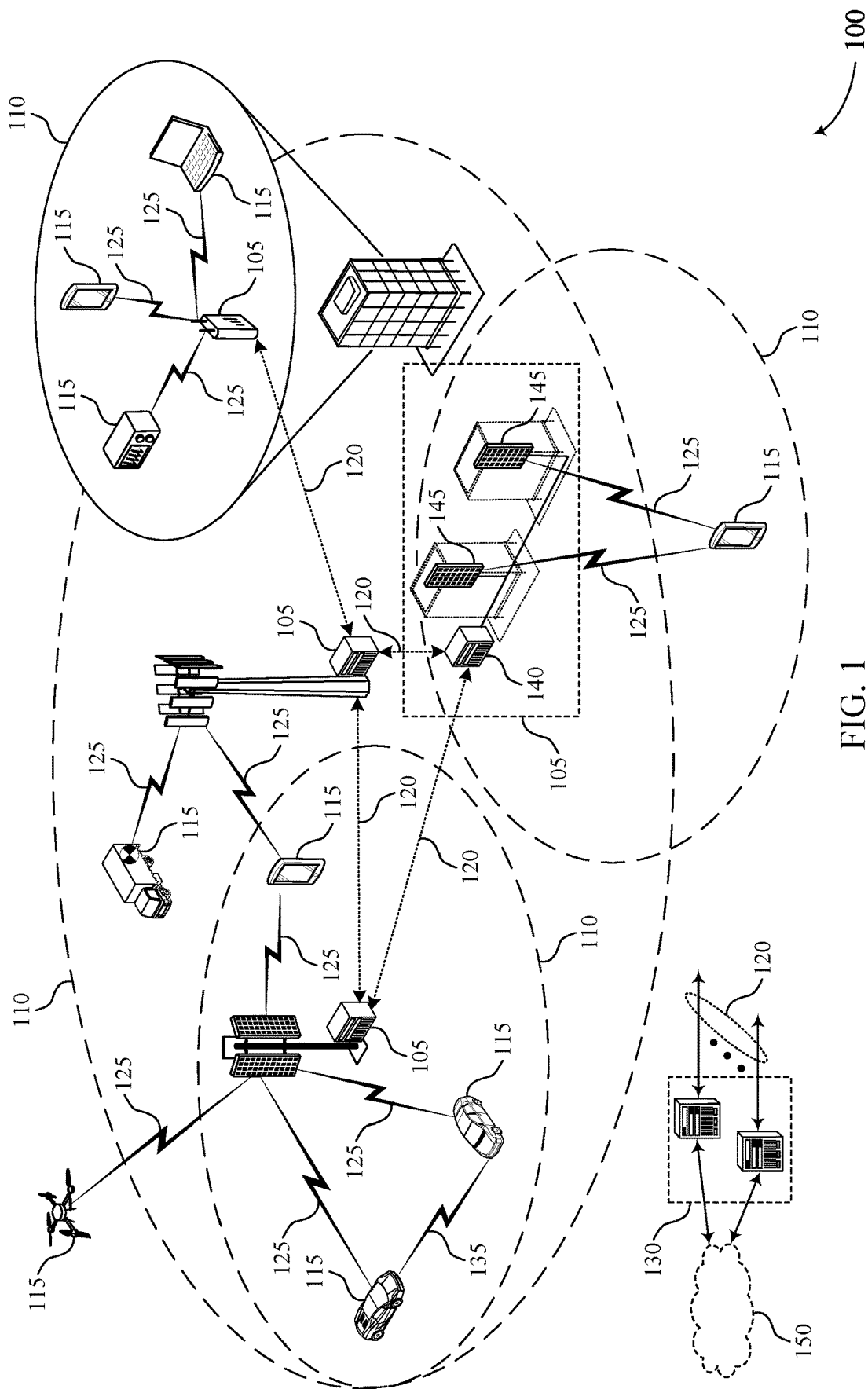
FIG. 1 illustrates an example of a wireless communications system that supports cell measurement and reporting for mobility in distributed wireless communications systems in accordance with aspects of the present disclosure.

A wireless communications system may include various communication devices such as a user equipment (UE) and a base station, which may provide wireless communication services to the UE. For example, a base station may be a next-generation NodeB (referred to as a gNB) that may support multiple radio access technologies including fourth generation (4G) systems, such as 4G Long-Term Evolution (LTE), as well as fifth generation (5G) systems, which may be referred to as 5G new radio (NR). The wireless communications system may be capable of supporting communications in a network via multiple cells or cell sets.

In some wireless communications systems, a UE may establish a connection with one or more cells that are activated for communication with the UE. If channel conditions change (due to the UE moving farther away from a cell, signal obstruction, or environmental factors), the UE may perform a handover to a different cell (e.g., to a cell that provides better coverage for the UE). As such, using traditional mobility techniques, a base station may transmit layer three (L3) signaling, such as radio resource control (RRC) signaling, to the UE to trigger the handover. The use of L3 signaling to facilitate handovers across cells may be referred to as L3 mobility. Because L3 mobility involves RRC signaling, L3 mobility may cause delays in handover, increase signaling, and increased processing complexity, which may result in high latency that may be detrimental to communications in the wireless communications system (e.g., in examples in which the UE performs frequent handovers, such as in examples in which the UE communicates with the base station over frequency range 1 (FR1) and frequency range 2 (FR2) radio frequency spectrum bands).

According to some aspects, the UE and the base station may instead use layer one (L1) or layer two (L2) signaling for mobility, which may reduce the latency associated with performing a handover, beam management, cell activation or deactivation, or other mobility procedures for the UE. For example, the UE or the base station may exchange L1/L2 signaling to maintain an activated cell set for the UE. Such maintenance of the activated cell set may be in the context of or otherwise support mobility procedures via L1/L2 signaling, which may result in overall increased performance, reduced latency, and reduced cell or connection loss as compared to mobility procedures utilizing by L3 signaling.

A UE may establish a communication link with a network via one or multiple cells of a cell set configured for the UE by the network. In such cases, the cell set may be configured for L1 or L2 (L1/L2) mobility, such that the UE or the network may activate or deactivate cells of the configured cell set via L1/L2 signaling. The network may include a central unit (CU) that supports multiple distributed units (DUs), and each DU may support one or more cells of the configured cell set. In scenarios in which the split between the CU functionality and the DU functionality separates the L1/L2 layers (at the DU) from the L3 layer (at the CU), the processing of L1/L2 signaling for UE mobility may be performed by a DU without the involvement and overhead (or with reduced or limited involvement or overhead) associated with L3 signaling at the CU. In some cases, the various cells supported by different DUs may have non-collated physical (PHY), medium access control (MAC), and radio link control (RLC) layers. For example, individual cells may belong to different DUs within the same CU, and an activated or a deactivated cell set may contain cells served by different DUs.

As part of a mobility procedure involving cells of the configured cell set (such as maintenance of the activated cell set), the UE may measure a channel quality between the UE and each cell of the configured cell set and may transmit one or more measurement reports to a DU based on the measurements. In some aspects, a measurement report may include channel measurements for one or more cells controlled by different DUs such that the UE may transmit the measurement report to a different DU supporting the one or more cells. That is, L1/L2 measurements may pertain to specific cells across different DUs (and not to the same DU). This may cause a lack of shared knowledge of channel conditions or cell measurements of cells controlled by the same DU, which may result in inefficient cell activation or deactivation for cells of a DU.

In some examples, the UE may transmit measurement reports for an L1/L2 mobility procedure on a per-DU basis such that each measurement report corresponds to cells within the same DU. For example, a UE may measure a channel between the UE and each of a set of cells supported by a DU, and may transmit one or more measurement reports including the channel measurements for the set of cells to the same DU via L1/L2 signaling. As such, the DU may have more complete channel knowledge for each cell measured by the UE that is supported by that DU. In some cases, the UE may transmit the one or more measurement reports to the DU according to various reporting options. For example, the UE may transmit, to a DU, a DU-specific measurement report (e.g., corresponding to the same DU) including channel measurement results for each of the cells of the configured cell set that are supported by the same DU. In some other examples, the UE may transmit, to a DU, DU-specific measurement reports including channel measurements for a group of cells in the activated cell set or for a group of cells in the deactivated cell set supported by the same DU. The UE may also transmit, to a DU, a DU-specific joint measurement report including channel measurements of both the activated cell set and the deactivated cell set supported by the same DU.

In accordance with the DU-specific measurement reports, the UE may transmit the measurement reports according to various reporting format options. For example, L1/L2 reporting may be configured for a group of cells within a DU, and there may be multiple groups of cells (and corresponding configurations) active. Reporting parameters such as periodicity and beam quality ranking may also be configured. For downlink-based scenarios, a UE may perform channel measurements of a set of activated or deactivated cells in a DU and transmit measurement reports to the same DU. For uplink-based scenarios, a UE may transmit a reference signal for L1/L2 mobility, which the cells in the configured cell set may use to perform channel measurements associated with the UE. For example, a UE may receive reporting configurations (e.g., via RRC) and may configure certain measurement types for activated cell, deactivated cell, or joint measurements and reporting. The DU may use the measurements to determine which cells supported by the same DU are activated for the UE, which cells are deactivated for the UE, or which cells are candidate cells for the UE.

Aspects of the disclosure are described in the context of wireless communications systems. Aspects are also described with respect to a network architecture, split options, and a process flow. Aspects of the disclosure are further illustrated by and described with reference to apparatus diagrams, system diagrams, and flowcharts that relate to cell measurement and reporting for mobility in distributed wireless communications systems.

FIG. 1 illustrates an example of a wireless communications system 100 that supports cell measurement and reporting for mobility in distributed wireless communications systems in accordance with aspects of the present disclosure. The wireless communications system 100 may include one or more base stations 105, one or more UEs 115, and a core network 130. In some examples, the wireless communications system 100 may be a LTE network, an LTE-Advanced (LTE-A) network, an LTE-A Pro network, or a NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may include a packet-based network that operates according to a layered protocol stack. The layered protocol stack may include an RRC layer, a Packet Data Convergence Protocol (PDCP) layer, an RLC layer, a MAC layer, and a PHY layer. L3 of the protocol stack may include the RRC layer, L2 may include the PDCP layer, the RLC layer, and the MAC layer, and Layer 1 L2 may include the PHY layer. In the user plane, communications at the bearer or PDCP layer may be IP-based. The RLC layer may perform packet segmentation and reassembly to communicate over logical channels. The MAC layer may perform priority handling and multiplexing of logical channels into transport channels. The MAC layer also may use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the PHY layer, transport channels may be mapped to physical channels.

In the wireless communications system 100, the protocol stack layers described herein may be split into different units. For example, a base station 105 may include one or more CUs, DUs, radio units (RUs), or a combination thereof, and each CU, DU, or RU may include one or more of the protocol stack layers described herein. Additional details relating to such different units of the base station 105 are described herein, including with reference to FIGS. 2 and 4. In some aspects, the base station 105 may include a CU that supports multiple DUs, and each DU of the multiple DUs may support one or more cells with which a UE 115 may communicate. Additionally, or alternatively, a UE 115 or other network component may include a CU that supports multiple DUs.

A UE 115 may establish a connection with one or more cells that are activated (e.g., by a network node or base station) for communication with the UE 115. If channel conditions change (due to the UE 115 moving farther away from a cell, signal obstruction, or environmental factors), the UE 115 may perform a handover to a different cell (such as a cell that provides better coverage to the UE) or may perform beam management. Traditional mobility relies on L3 signaling, such as RRC signaling, for mobility, which may cause delays or increase signaling overhead.

According to aspects herein, the UE 115 and the base station 105 may instead utilize L1 or L2 signaling to reduce the latency associated with mobility procedures at the UE 115. For example, the UE 115 or the base station 105 may exchange L1/L2 signaling to maintain an activated cell set for the UE 115. Such maintenance of the activated cell set may be in the context of or otherwise support mobility procedures via L1/L2 signaling, which may result in increased performance and reduced cell loss as compared to mobility procedures using L3 signaling.

In such examples in which the UE 115 and the base station 105 perform mobility procedures via L1/L2 signaling, the base station 105 may support a cell set that is configured for L1/L2 mobility and such a cell set may be referred to as an L1/L2 configured cell set. The L1/L2 configured cell set may include cells supported by a DU of the base station 105 (which may be supported by a common CU of the base station 105) the UE 115, or other network component, and may include one or more subsets of cells. Such subsets of cells of the L1/L2 configured cell set may include an L1/L2 activated cell set including cells with which the UE 115 may communicate, an L1/L2 deactivated cell set including cells with which the UE 115 may refrain from communicating, or an L1/L2 candidate cell set including cells that the UE 115 may autonomously add to the L1/L2 activated cell set.

In some examples of L1/L2 mobility, the UE 115 may measure a quality of a channel between the UE 115 and each cell of the L1/L2 configured cell set and may transmit one or more DU-specific measurement reports such that a DU receives channel measurement results for cells controlled by the DU. For example, the UE 115 may perform channel measurements for a subset of cells of a configured cell set, where each of the subset of cells is supported by a DU of one or more DUs supported by a CU. The UE 115 may generate a DU-specific measurement report for the DU including channel measurement results for each of the subset of cells and may transmit the measurement report to the DU. As such, the UE 115 may enable more efficient mobility procedures for the UE using less complex signaling and processing.

Figure 2:
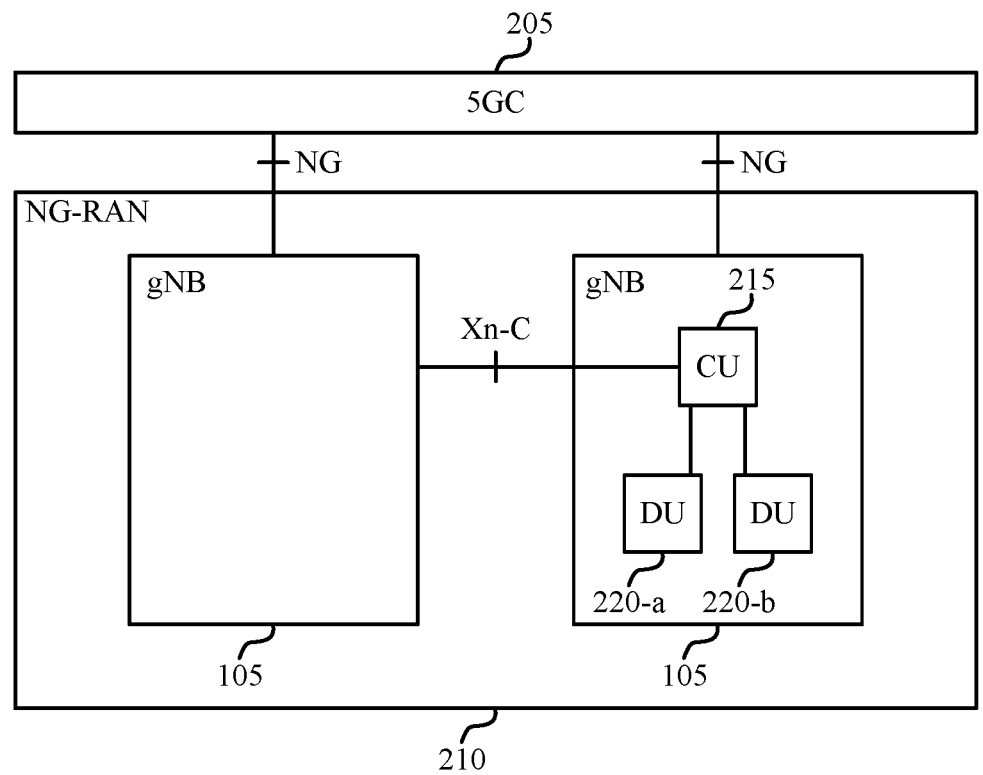
FIG. 2 illustrates an example of a network architecture that supports cell measurement and reporting for mobility in distributed wireless communications systems in accordance with aspects of the present disclosure.

FIG. 2 illustrates an example of a network architecture 200 that supports cell measurement and reporting for mobility in distributed wireless communications systems in accordance with aspects of the present disclosure. In some examples, network architecture 200 may implement aspects of wireless communications system 100. For example, the network architecture 200 may include a base station 105-*a*, which may be an example of corresponding devices described herein with reference to FIG. 1.

In some cases, a core network 205, which may be an example of, or otherwise function as, a 5G core network (5GC), may communicate with a radio access network (RAN) 210. In some cases, RAN 210 may be an example or otherwise function as an NG-RAN over an NG interface. The RAN 210 may include base stations 105 that may communicate with each other over an Xn-C interface. The base station 105 may include a CU 215 and multiple DUs 220, such as a DU 220-*a* and a DU 220-*b*. The CU 215 may be a logical node hosting RRC, Service Data Adaptation Protocol (SDAP), or PDCP protocols of the base station 105. The CU 215 at the base station 105 may also control the operation of one or more DUs 220 at the base station 105, and may terminate an F1 interface connected with each DU 220 of the one or more DUs 220. The DU 220 may be a logical node hosting RLC, MAC, and PHY layers of the base station 105, and the operation of the DU 220 may be supported by the DU 215. Each DU 220 may control or otherwise support one or multiple cells such that each cell is supported by a single DU 220. The DU 220 may also terminate an F1 interface connected with the CU 215.

The DUs 220 may support DU-specific measurement techniques for UE mobility. In a downlink scenario, a DU 220 may support one or more cells (or one or more RUs supporting the cells), and may configure the cells for a UE to perform L1/L2 measurements for mobility procedures. The UE may measure the cells and report to the DU 220 the measurements that are specific to the DU 220 (e.g., measurements of cells supported by the DU 220). In an uplink scenario, a DU 220 may measure reference signaling from a UE and may determine channel quality for cells controlled by the DU 220. Based on the determined channel quality, the DU 220 may activate, deactivate, or configure as a candidate, one or more cells supported by the DU 220 for L1/L2 mobility for the UE.

Figure 3:
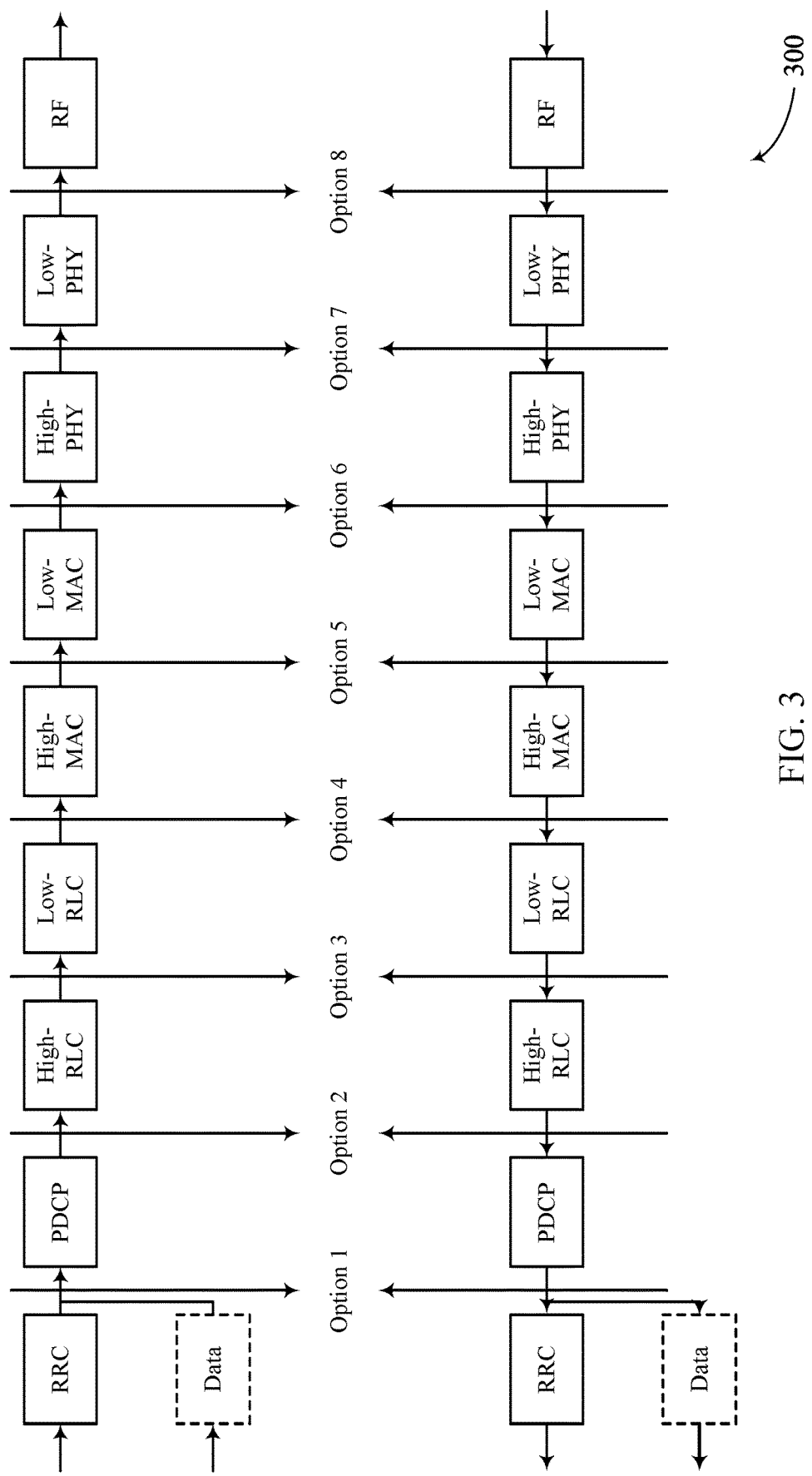
FIG. 3 illustrates an example of split options that support cell measurement and reporting for mobility in distributed wireless communications systems in accordance with aspects of the present disclosure.

FIG. 3 illustrates an example of split options 300 for protocol stack layers at CUs and DUs of a base station that supports cell measurement and reporting for mobility in distributed wireless communications systems in accordance with aspects of the present disclosure. The split options 300 illustrate different split options for splitting a base station 105 functionality between CU functionality, DU functionality, and, in some examples, RU functionality. The base station 105 may be an example of a base station 105 as described with reference to FIGS. 1 and 2.

In some examples, in which the split options 300 may illustrate single splits between CU functionality and DU functionality, option 1 may provide an example of a protocol stack layer split such that a CU includes an RRC layer and a DU includes a PDCP layer, a high RLC layer, a low RLC layer, a high MAC layer, a low MAC layer, a high PHY layer, a low PHY layer, and a radio frequency layer. Similarly, option 2 may provide an example of a protocol stack layer split such that a CU includes an RRC layer and a PDCP layer, and a DU includes a high RLC layer, a low RLC layer, a high MAC layer, a low MAC layer, a high PHY layer, a low PHY layer, and a radio frequency layer. The remainder of options 3, 4, 5, 6, 7, and 8 also may illustrate single splits between CU functionality and DU functionality.

In some other examples, the base station 105 also may include one or more RUs. In such examples, the protocol stack layers may feature double split options between CU functionality, DU functionality, and RU functionality. For example, the protocol stack layers may be split such that a PHY layer is in an RU (for example, both a high PHY layer and a low PHY layer are included in an RU functionality) or such that the PHY layer is partially in both an RU and a DU (for example, the high PHY layer is included in DU functionality and the low PHY layer is included in RU functionality). In an example of an option 2 and 6 split, for instance, a CU may include the RRC and PDCP layers, a DU may include the RLC and MAC layers, and an RU may include the PHY layer. Alternatively, in an example of an option 2 and 7 split (which may be referred to as 7.2x in some deployments, such as in open RAN (O-RAN) deployments), a CU may include the RRC and PDCP layers, a DU may contain the RLC, MAC, and high PHY layers, and an RU may contain the low PHY layer. Other double split options may similarly partition layers between a CU, a DU, and an RU.

In some aspects, a UE 115 may support communications with cells supported by different DUs under the same CU. In such aspects, the UE 115 may communicate with cells that have non-collocated PHY, MAC, and RLC layers and common PDCP and RRC layers. As such, although the UE 115 and the base station 105 may use L1/L2 signaling for mobility, there may be a lack of a path for data or control information from the PDCP layer to different RLC layers in some split configurations (such as in the examples of an option 2 and 6 split or a 7.2x split). As such, the UE 115 may transmit measurement results for a set of cells (as part of a mobility procedure) to a DU that is associated with that set of measured cells. Thus, for L1/L2 mobility, the measurement results transmitted by the UE 115 to a corresponding DU may reduce signaling overhead for L1/L2 mobility procedures and increase efficiency at the DU for configuring cells for the UE 115.

Figure 4:
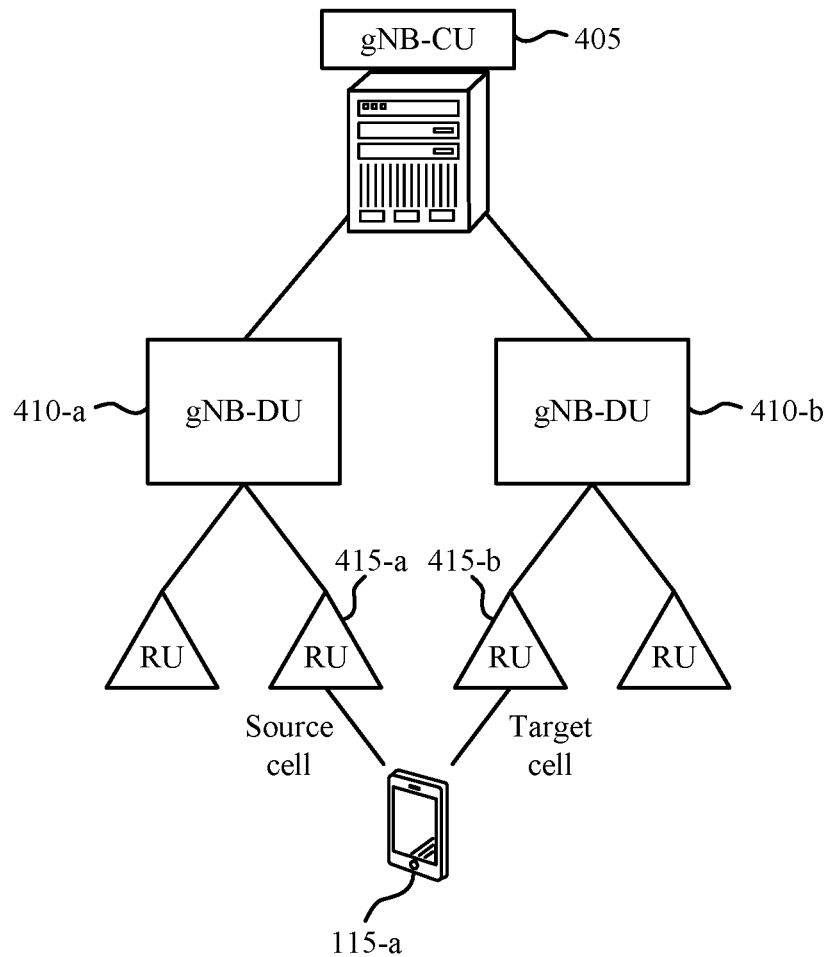
FIG. 4 illustrates an example of a wireless communications system that supports cell measurement and reporting for mobility in distributed wireless communications systems in accordance with aspects of the present disclosure.

FIG. 4 illustrates an example of a wireless communications system 400 that supports cell measurement and reporting for mobility in distributed wireless communications systems in accordance with aspects of the present disclosure. In some examples, wireless communications system 400 may implement aspects of wireless communications system 100. For example, the wireless communications system 400 may include a UE 115-*a*, which may be an example of corresponding devices described herein with reference to FIGS. 1, 2, and 3. In some cases, the UE 115-*a* may support communications with cells supported by the same DU under a CU of a base station 105 (or UE 115-*a*, or other network component).

In some cases, a CU 405 may support a first DU 410-*a* and a second DU 410-*b*, and each DU 410 may support one or more cells 415 (also referred to as one or more RUs). In some examples, after connecting and communicating with a source cell 415-*a*, the base station 105 may handover the UE 115-*a* to a target cell 415-*b* (for example, the target cell 415-*b* may provide a greater receive signal strength or channel metrics relative to what is provided by the source cell 415-*a*). In other words, the UE 115-*a* may perform a handover from the source cell 415-*a* supported by the first DU 410-*a* to the target cell 415-*b* supported by the second DU 410-*b*. The UE 115-*a* also may support communications with cells 415 supported by the same DU 410 under the same CU 405.

In some systems, although the UE 115-*a* may be performing the handover across cells 415 supported by the same CU 405, and the CU 405 includes the same L3 protocols (such as a same RRC layer), the base station 105 may still use L3 signaling to trigger handovers across these cells 415. Because L3 mobility involves RRC signaling however, L3 mobility may cause delays in processing and signaling. As a result, the latency associated with performing a handover procedure (using L3 mobility) may be high. As described herein, the UE 115-*a* and the base station 105 may support efficient techniques for facilitating L1/L2 mobility to limit the latency associated with the mobility procedure and to DU-specific measurement reports for cells 415 controlled by a same DU 410 of the base station 105. According to such techniques, DU-specific measurement reporting may involve a UE 115-*a* performing channel measurements for each of cell 415-*a* and 415-*b*, and the UE 115-*a* may transmit a first measurement report to DU 410-*a* that includes the measurements of cell 415-*a* and transmit a second measurement report to DU 410-*b* that includes the measurements of cell 415-*b*.

Figure 5:
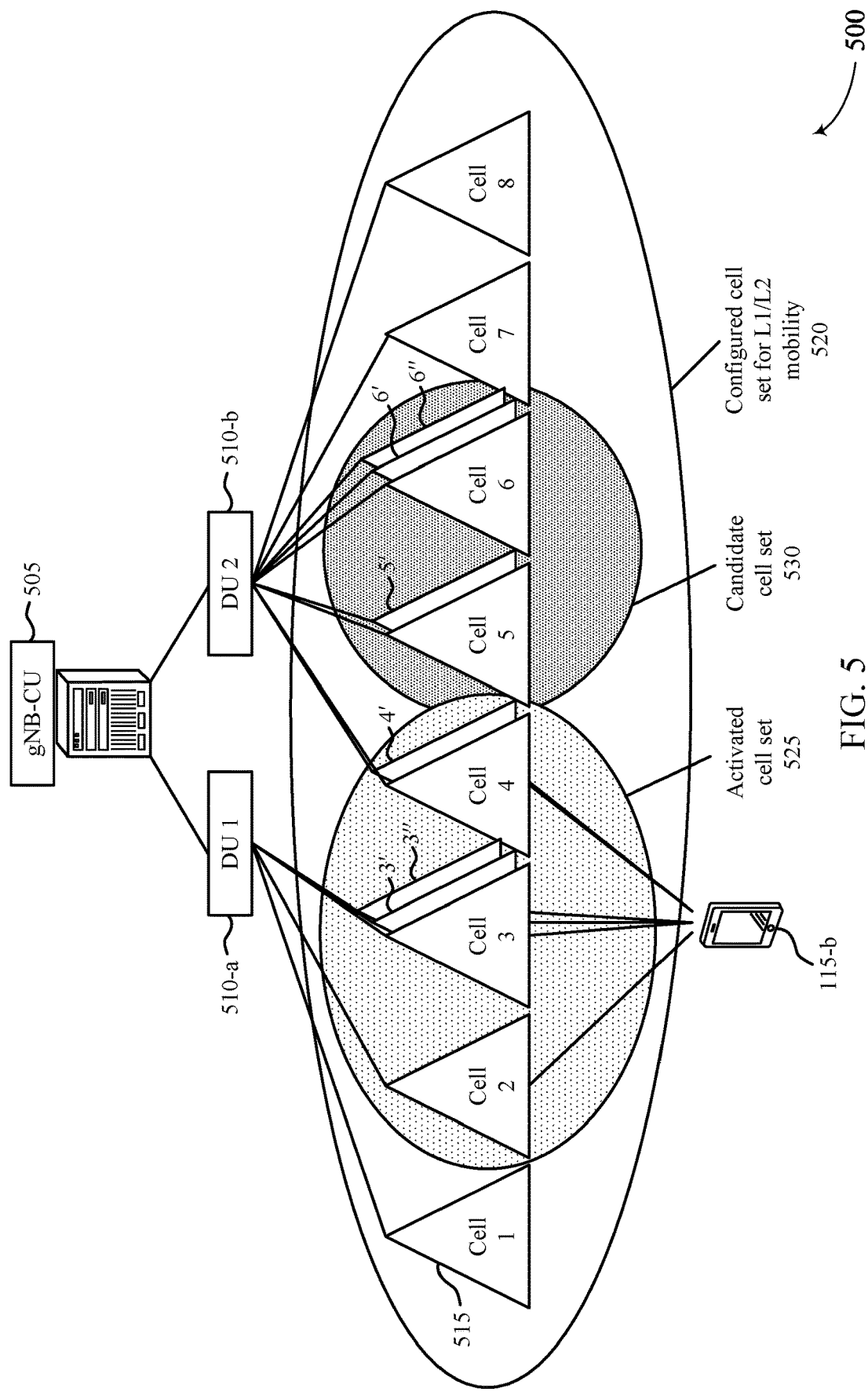
FIG. 5 illustrates an example of a wireless communications system that supports cell measurement and reporting for mobility in distributed wireless communications systems in accordance with aspects of the present disclosure.

FIG. 5 illustrates an example of a wireless communications system 500 that supports cell measurement and reporting for mobility in distributed wireless communications systems in accordance with aspects of the present disclosure. In some examples, wireless communications system 500 may implement aspects of wireless communications system 100. For example, the wireless communications system 400 may include a UE 115-*b*, which may be an example of a UE 115 described herein with reference to FIGS. 1-4. The wireless communications system 500 also includes a base station 105, which may be an example of a base station 105 as described with reference to FIGS. 1-4, supporting a CU 505, a DU 510-*a*, and a DU 510-*b*. The wireless communications system 500 may implement aspects of the wireless communications system 100. For example, the wireless communications system 500 may support efficient techniques for facilitating shared channel knowledge of cells 515 among both the DU 510-*a* and the DU 510-*b*.

In some cases, the DUs 510 may support multiple cells 515 and the UE 115-*b* may communicate with the base station 105 via one or more of the multiple cells 515. For example, the DU 510-*a* may control, operate, or otherwise support cells 1-3 and the DU 510-*b* may control, operate, or otherwise support cells 4-8. Further, the cell 3 may include the cell 3, a cell 3', and a cell 3", which may represent a carrier aggregation deployment at cell 3. Similarly, the cell 4 may include the cell 4 and a cell 4', the cell 5 may include the cell 5 and a cell 5', and the cell 6 may include the cell 6, a cell 6', and a cell 6", which also may represent carrier aggregation deployments at cells 4, 5, and 6, respectfully.

In some aspects, the base station 105 may transmit RRC signaling to the UE 115-*b* configuring a set of cells 515 for L1/L2 mobility, and the configured set of cells 515 for L1/L2 mobility may be referred to as an L1/L2 configured cell set 520. Each DU 510 supported by the base station 105 may have its own L1/L2 configured cell set, and the union of all configured cell sets across DUs 510 supported by the CU 505 may constitute an overall L1/L2 configured cell set 520. In some examples, the base station 105 may indicate, to the UE 115-*b* via RRC signaling, an L1/L2 configured cell set supported by each DU 510. In some other examples, the base station 105 may indicate, to the UE 115-*b* via the RRC signaling, the overall L1/L2 configured cell set 520 supported by all DUs 510.

The base station 105 also may indicate, via the RRC signaling, an L1/L2 activated cell set 525. The L1/L2 activated cell set 525 may refer to a group of cells 515 in the configured cell set 520 that are activated for communication and managed by L1/L2 signaling. Cells 515 in the L1/L2 activated cell set 525 may be used for control and data communications between the UE 115-*b* and the base station 105. Further, each DU 510 supported by the base station 105 may have its own L1/L2 activated cell set, and the union of all activated cell sets across DUs 510 may constitute an overall L1/L2 activated cell set 525. In some examples, the base station 105 may indicate, to the UE 115-*b* via the RRC signaling, an L1/L2 activated cell set supported by each DU 510. In some other examples, the base station 105 may indicate, to the UE 115-*b* via the RRC signaling, the overall L1/L2 activated cell set 525 supported by all DUs 510.

The base station 105 also may indicate, via the RRC signaling, an L1/L2 deactivated cell set. The L1/L2 deactivated cell set may refer to a group of cells 515 in the configured cell set 520 that are deactivated and managed by L1/L2 signaling. Cells 515 in the L1/L2 deactivated cell set may not be used for control and data communications between the UE 115-*b* and the base station 105 and can be activated by L1/L2 signaling. Further, each DU 510 supported by the base station 105 may have its own L1/L2 deactivated cell set, and the union of all deactivated cell sets across DUs 510 may constitute an overall L1/L2 deactivated cell set. In some examples, the base station 105 may indicate, to the UE 115-*b* via the RRC signaling, an L1/L2 deactivated cell set supported by each DU 510. In some other examples, the base station 105 may indicate, to the UE 115-*b* via the RRC signaling, the overall L1/L2 deactivated cell set supported by all DUs 510.

The base station 105 also may indicate, via the RRC signaling, an L1/L2 candidate cell set 530. The L1/L2 candidate cell set 530 may refer to a group of cells 515 in a deactivated cell set that may be autonomously added to the activated cell set 525 by the UE 115-*b*. Each DU 510 supported by the base station 105 may have its own L1/L2 candidate cell set, and the union of all candidate cell sets across DUs 510 may constitute an overall L1/L2 candidate cell set 530. In some examples, the base station 105 may indicate, to the UE 115-*b* via the RRC signaling, an L1/L2 candidate cell set supported by each DU 510. In some other examples, the base station 105 may indicate, to the UE 115-*b* via the RRC signaling, the overall L1/L2 candidate cell set 530 supported by all DUs 510. The UE 115-*b*, based on receiving the RRC signaling from the base station 105, may identify the configured cell set 520 for L1/L2 mobility, the activated cell set 525, the deactivated cell set, and the candidate cell set 530.

In some aspects, and as described in more detail with reference to FIG. 3, the functional split between the CU 505 and the DUs 510 may separate L1/L2 from L3 and the various cells 515 supported by the DUs 510 may have non-collocated PHY, MAC, and RLC layers. As such, in examples in which the UE 115-*b* measures a set of cells 515 as part of a mobility procedure (such as an L1/L2 mobility procedure), the UE 115-*b* may transmit measurement results for the set of cells 515 to a DU 510 that is associated with that set of cells 515 (and not to a DU 510 that is not associated with that set of cells 515).

For example, the DU 510-*a* may control the cells 2 and 3 that are included within the activated cell set 525 and the DU 510-*b* may control the cells 7 and 8 that are included within the deactivated cell set. As part of an L1/L2 mobility procedure (for example, as part of maintenance of the activated cell set 525), the UE 115-*b* may measure each (if not all) of the cells 515 included in the configured cell set 520, including the cells 2, 3, 7, and 8. In some examples, the UE 115-*b* may transmit the channel measurement results associated with the cells 2 and 3 to the DU 510-*a* and may transmit the channel measurement results associated with the cells 7 and 8 to the DU 510-*b* and the DU 510-*a*.

In some implementations, the UE 115-*b* may transmit or otherwise provide DU-specific measurement reports to a DU 510 for the L1/L2 configured cells belonging to the DU 510 supported by the CU 505. As such, the UE 115-*b* and the base station 105 may experience more optimal activated cell management within a DU 510 and across all serving DUs 510. For example, the UE 115-*b* may transmit one or more DU-specific measurement reports including channel measurements for the cells 515 controlled by the DU 510-*a*. Such signaling of measurement reports to a corresponding DU 510 controlling the cells 515 included in the measurement reports may be conveyed via L1, L2, or L3 signaling and may include separate or joint measurements in terms of activated/deactivated cells 515 (or beams of activated/deactivated cells 515). The UE 115-*b* may transmit the one or more measurement reports to the DU 510-*a* including channel measurement results for cells 515 controlled by the DU 510-*a* according to various reporting options, including a periodic reporting option, an aperiodic reporting option, or a semi-persistent reporting option. In some implementations, the UE 115-*b* may receive L1/L2 signaling from the base station 105 (from one or more of the DUs 510 supported by the base station 105), controlling which reporting option is activated or otherwise used by the UE 115-*b*. In some aspects, the L1/L2 signaling controlling which reporting option is activated may activate a reporting option from a previously configured (such as an RRC configured) list of reporting options.

The DU 510, or DUs 510, based on receiving the channel measurement results associated with cells 515 controlled by one or more different DUs 510, may account for the capability of the UE 115-*b* in terms of a number or quantity of L1/L2 activated cells within a DU 510 such that cells 515 associated with a greatest channel metric are activated across all serving DUs 510. Such a channel metric on the basis of which the DUs 510 may manage cell activation or deactivation for the UE 115-*b* may include a channel quality, a cell loading, or a mobility prediction, among other examples. For example, the cells 515 may be included within the activated cell set 525 based on having a greatest channel quality relative to other cells 515 across the DU 510-*a* and the DU 510-*b*, a cell loading relative to other cells 515 across the DU 510-*a* and the DU 510-*b*, or a projected or predicted motion tracking or proximity to the UE 115-*b* relative to other cells 515 across the DU 510-*a* and the DU 510-*b* (for example, based on inertial measurement at the UE 115-*b* or predicted or knowledge of movement of the UE 115-*b*).

In examples in which cells 515 are included within the activated cell set 525 based on a projected or predicted motion tracking or proximity to the UE 115-*b* relative to other cells 515 across the DU 510-*a* and the DU 510-*b*, the UE 115-*b* or the base station 105 may include cells 515 within the activated cell set 525 if those cells 515 are associated with (or are likely to be associated with) a relatively higher channel quality in the future (based on the movement of the UE 115-*b*), even if those cells 515 are associated with a relatively worse channel quality currently. In other words, the UE 115-*b* or the base station 105 may include one or more cells 515 within the activated cell set 525 if the UE 115-*b* is moving towards those one or more cells 515. Similarly, the UE 115-*b* and the base station 105 may remove one or more cells 515 from the activated cell set 525 if the UE 115-*b* is moving away from those one or more cells 515.

Further, the UE 115-*b* may measure a quality of a channel between the UE 115-*b* and each cell of the L1/L2 configured cell set and may transmit one or more DU-specific measurement reports such that a DU 510 receives channel measurement results for cells 515 supported by the DU 510. For example, the UE 115-*b* may perform channel measurements for a subset of cells 515 of a configured cell set, where each of the subset of cells is supported by a DU 510-*a* of one or more DUs 510 supported by a CU 505. The UE 115-*b* may generate a DU-specific measurement report for the DU 510-*a* including channel measurement results for each of the subset of cells 515 and may transmit the measurement report to the DU 510-*a*. As such, the UE 115-*b* may enable more efficient mobility procedures for the UE 115-*b* using less complex signaling and processing.

Additionally, the UE 115-*b* may transmit the one or more DU-specific measurement reports to various DUs 510 relative to the DU 510 supporting the cells 515 included in the one or more measurement reports according to various reporting format options. In some examples, for instance, the UE 115-*b* may generate separate measurement reports including beam or cell quality rankings, or both, for each of an activated cell set and a deactivated cell set of one DU 510 and may transmit the separate measurement reports to a different DU 510. For example, the UE 115-*b* may generate a first DU-specific measurement report including channel measurements for a set of activated cells 515 (e.g., any of cells 2, 3, or 4) controlled by the DU 510-*a* and a second DU-specific measurement report including channel measurements for a set of deactivated cells 515 (e.g., any of cells 7 or 8) controlled by the DU 510-*b*. The UE 115-*b* may in some aspects generate a third DU-specific measurement report including channel measurements for a set of deactivated cells 515 (e.g., cell 1 in this example) controlled by the DU 510-*a*. The UE 115-*b* may transmit the first measurement report to the DU 510-*a*, the second measurement report to the DU 510-*b*, and the third measurement report to DU 510-*a*.

In such examples, the first measurement report may include a ranking of the set of activated cells 515 controlled by the DU 510-*a* or a ranking of beams associated with the set of activated cells 515 controlled by the DU 510-*a* (as well as any associated metrics, such as the metric on which the ranking is based). The second measurement report may similarly include a ranking of the set of deactivated cells 515 controlled by the DU 510-*b* or a ranking of beams associated with the set of deactivated cells 515 controlled by the DU 510-*b* (as well as any associated metrics, such as the metric on which the ranking is based). Alternatively, the separate measurement reports may include the channel measurements (without an explicitly reported ranking). In some aspects, the UE 115-*b* may report the channel measurements at a level or granularity based on whether the reported cells 515 are activated or not. For example, in some implementations, the first measurement report including the channel measurements for the activated cells of the DU 510-*b* may include beam-level reporting and the second measurement report including the channel measurements for the deactivated cells of the DU 510-*b* may include cell-level reporting.

Alternatively, in some other examples, the UE 115-*b* may generate a joint DU-specific measurement report including beam or cell measurements, or both, for an activated cell set and a deactivated cell set of one DU 510 and may transmit the joint measurement report to the same DU 510. For example, the UE 115-*b* may generate a joint measurement report including channel measurements for both a set of activated cells 515 controlled by the DU 510-*a* (e.g., any of cells 2, 3, or 4) and a set of deactivated cells 515 (e.g., cell 1) controlled by the DU 510-*a* and may transmit the joint measurement report to the DU 510-*a*. The joint measurement report may include a joint ranking of the set of activated and deactivated cells 515 controlled by the DU 510-*a* or a joint ranking of beams associated with the set of activated and deactivated cells 515 controlled by the DU 510-*a* (as well as any associated metrics, such as the metric on which the ranking is based). Alternatively, the joint measurement report may include the channel measurements (without an explicitly reported ranking).

In some implementations, the UE 115-*b* may receive a configuration (such as an RRC configuration) of a set of reporting parameters that the UE 115-*b* may include in the one or more measurement reports. Such a set of reporting parameters may include a cell set to report, a number of beams or cells 515 to report, a periodicity for transmitting the one or more measurement reports, or a trigger for transmitting the one or more measurement reports, among other examples. The reporting parameter of the cell set to report may indicate, to the UE 115-*b*, which set of cells 515 to include within a measurement report (such as whether to include a set of activated cells 515 of one DU 510 or a set of deactivated cells 515 of one DU 510, or both) and the reporting parameter of the number of beams or cells 515 to report may indicate, to the UE 115-*b*, a quantity of beams or cells 515 that the UE 115-*b* may include within a DU-specific measurement report. The configuration may be DU-specific, specific to the UE 115-*b*, or may be specific to the CU 505.

In some aspects, the UE 115-*b* may receive signaling (such as L1/L2 signaling) activating or deactivating one or more reporting parameters of the configured set of reporting parameters. For example, the UE 115-*b* may receive such activation/deactivation signaling from the DU 510 supporting the cells 515 being reported. In some cases, the DU 510 may have information about cell status (which cells 515 that are supported by the DU 510 are activated or deactivated) and may have more accurate channel quality or loading information relative to the DU 510 (the same DU 510 to which reporting is done). As such, the DU 510 supporting the cells being reported may have greater insight into which reporting parameters are most applicable to current channel or cell conditions. In such examples, the DU 510 may have knowledge on which reporting parameters are activated or deactivated.

In some other aspects, the UE 115-*b* may activate or deactivate one or more reporting parameters of the configured set of reporting parameters. For example, the UE 115-*b* may have information about the status of all serving cells 515 and the channel quality of all serving cells 515 (as the UE 115-*b* may directly measure all serving cells 515), which may provide the UE 115-*b* with insight into which reporting parameters are most applicable to current channel or cell conditions. Further, the UE 115-*b* may transmit signaling to the DU 510 to indicate or otherwise suggest activation or deactivation of one or more reporting parameters. The UE 115-*b* may transmit such an indication or suggestion to a DU 510 via L1/L2 signaling, such as via uplink control information (UCI) (such as a specific format of UCI) or a MAC control element (MAC-CE). In such examples, the UE 115-*b* and the DUs 510 may coordinate on which reporting parameters are activated or deactivated.

Further, although described herein in the context of a downlink-based channel measurement procedure in which the UE 115-*b* performs channel measurements and reports the measurements to the serving DU 510 or to a different DU 510, or both, the described techniques of facilitating more complete channel knowledge among multiple DUs 510 may be applied to uplink-based channel measurement procedures in which the UE 115-*b* transmits one or more reference signals and the cells 515 in the configured cell set 520 perform channel measurements on the one or more reference signals. For example, the UE 115-*b* may receive a configuration from the base station 105 (via one or more cells 515) of a set of resources over which the UE 115-*b* may transmit an uplink reference signal, such as a sounding reference signal (SRS), to each (if not all) cell 515 of the configured cell set 520. In some aspects, the configured set of resources may include a common set of time and frequency resources (for example, a common set of SRS time and frequency resources) across the multiple DUs 510 of the base station 105 such that the common resources are used across an entirety of the L1/L2 configured cell set 520.

In such examples in which the UE 115-*b* transmit an uplink reference signal over a common set of resources to each cell 515 of the configured cell set 520, the multiple DUs 510 controlling the cells 515 that receive the uplink reference signal may coordinate on the channel measurements obtained by each cell 515 of the configured cell set 520. For example, the DU 510-*a* may transmit or otherwise provide channel measurements obtained by the cells 1-3 to the DU 510-*a* and the DU 510-*b* may similarly transmit or otherwise provide channel measurements obtained by the cells 4-8 to the DU 510-*b*. In some implementations, the UE 115-*b* and the DUs 510 may exchange L1/L2 signaling to update the uplink-based channel measurement procedure based on one or more pre-configured options. For example, the UE 115-*b* and the DUs 510 may exchange L1/L2 signaling to switch between different sets of common resources or to adjust (such as to add or remove time or frequency resources) the common resource over which the UE 115-*b* may transmit the uplink reference signal to the cells 515 of the configured cell set 520. As such, the cells 515 in the configured cell set 520 may monitor for the uplink reference signal over the common set of resources, measure the uplink reference signal, and perform beam refinement based on the measurements.

Alternatively, the UE 115-*b* and the DUs 510 may employ a combination of downlink- and uplink-based channel measurements such that the UE 115-*b* may measure downlink reference signals transmitted over one or more beams from at least a subset of the cells 515 in the configured cell set 520 and may transmit an uplink reference signal over one or more beams to at least a subset of the cells 515 in the configured cell set 520 over a configured common set of resources. Such a combination of downlink- and uplink-based channel measurements may involve different reporting types (such as either downlink-based channel measurements or uplink-based channel measurements) that are configured within a DU 510 and across the DU 510 to which reporting is done.

In some aspects, the base station 105, or one of the DUs 510 of the base station 105, may select one or more cells 515 of the configured cell set 520 for communication with the UE 115-*b* based on the received channel measurements (in examples in which the UE 115-*b* and the base station 105 perform downlink-based channel measurements) or based on the measurements obtained by the cells 515 of the configured cell set 520 (in examples in which the UE 115-*b* and the base station 105 perform uplink-based channel measurements). For example, the base station 105, or one of the DUs 510 of the base station 105, may activate or deactivate one or more cells 515 to or from the activated cell set 525 based on the channel measurements. In some examples, the UE 115-*b* may receive signaling indicating the activation or deactivation of the one or more cells 515 via L1/L2 signaling.

Figure 6:
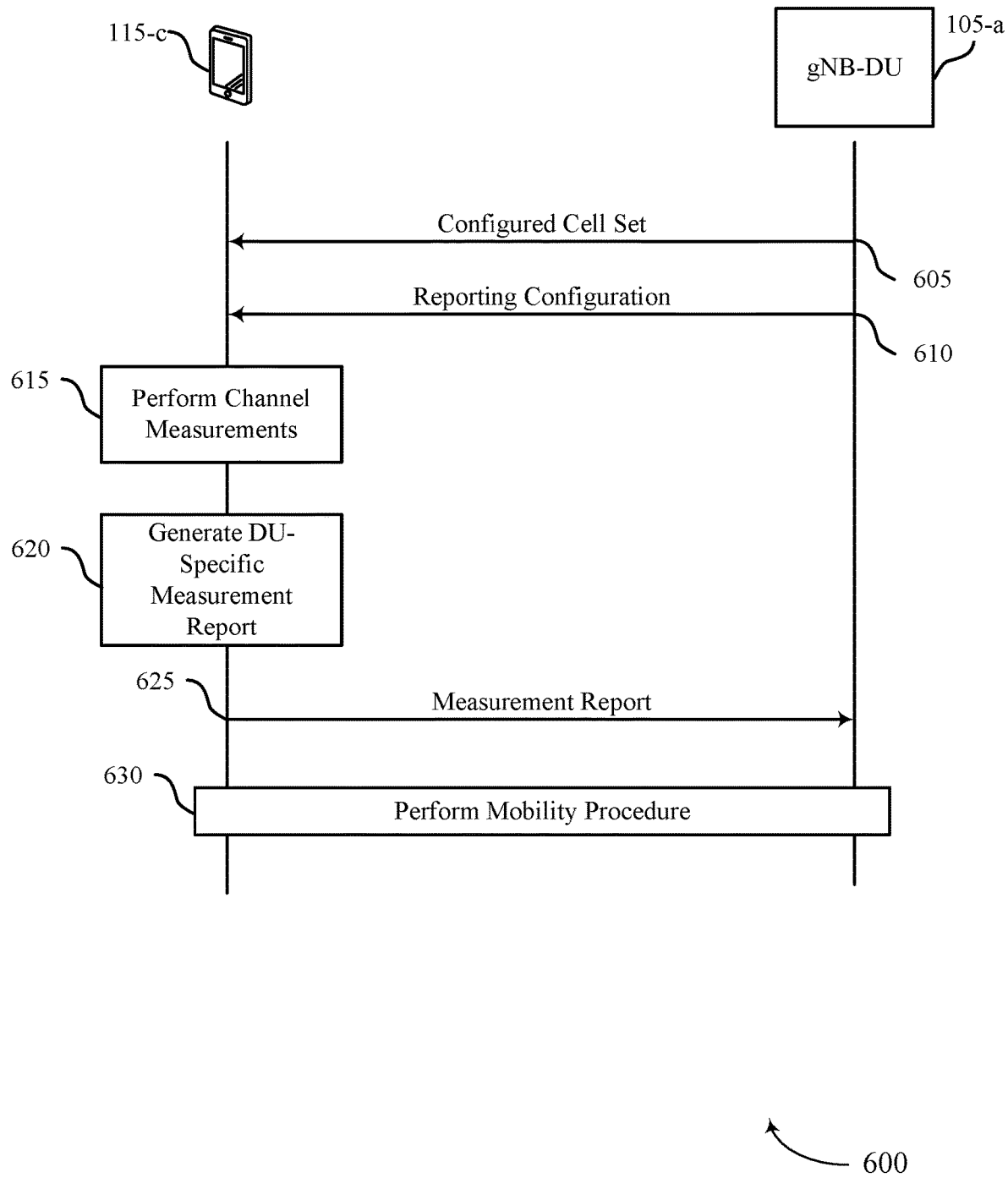
FIG. 6 illustrates an example of a process flow that supports cell measurement and reporting for mobility in distributed wireless communications systems in accordance with aspects of the present disclosure.

FIG. 6 illustrates an example of a process flow 600 that supports cell measurement and reporting for mobility in distributed wireless communications systems in accordance with aspects of the present disclosure. The process flow 600 may implement aspects of wireless communications systems 100, 400, or 500 or may be implemented by aspects of the wireless communications system 100, 400, or 500. For example, the process flow 600 may be based on a configuration by a base station 105-*a*, which may be implemented by a UE 115-*c*. The base station 105-*a* and the UE 115-*c* may be examples of a base station 105 and a UE 115, as described with reference to FIGS. 1-5. In the following description of the process flow 600, the operations between the base station 105-*a* and the UE 115-*c* may be transmitted in a different order than the example order shown, or the operations performed by the base station 105-*a* and the UE 115-*c* may be performed in different orders or at different times. Some operations may also be omitted from the process flow 600, and other operations may be added to the process flow 600.

At 605, a UE 115-*c* may receive, from a DU of a base station 105-*a*, an indication of a cell set configured for the mobility procedure for the UE 115-*c*. In some cases, the cell set may include multiple cells supported by one or more DUs of the base station 105-*a*, and may include a set of activated cells for the UE 115-*c*, a set of deactivated cells for the UE 115-*c*, or both. In such cases, such a cell set may be configured for L1 or L2 (L1/L2) mobility, such that the UE 115-*c* or the network may activate or deactivate cells of the configured cell set via L1/L2 signaling.

At 610, the UE 115-*c* may receive, from the DU of the multiple DUs of the base station 105-*a*, a reporting configuration for reporting measurements for the mobility procedure by the UE 115-*c*. In some examples, the reporting configuration may indicate a subset of cells supported by the DU of the base station 105-*a* for reporting. In some cases, the reporting configuration may additionally indicate a number of beams for reporting, a number of cells for reporting, a periodicity associated with reporting, a trigger for reporting, or any combination thereof.

At 615, the UE 115-*c* may perform, as a part of a mobility procedure, channel measurements for a subset of cells supported by the DU of the multiple DUs of the base station 105-*a*. In some cases, performing the channel measurements may include performing L1/L2 measurements for each cell of the subset of cells. In some other cases, the performing may include performing L3 measurements for one or more neighboring cells, where the cell set excludes the one or more neighboring cells.

At 620, the UE 115-*c* may generate a DU-specific measurement report for the DU of the multiple DUs of the base station 105-*a* based on performing the channel measurements. In some cases, the DU-specific measurement report may include channel measurement results for each of the subset of cells supported by the DU. In some cases, the UE 115-*c* may generate a DU-specific measurement report for a group of activated cells of the set of activated cells, a DU-specific measurement report for a group of deactivated cells of the set of deactivated cells, or a joint DU-specific measurement report for a cell group that includes one or more activated cells supported by the DU from the set of activated cells and one or more deactivated cells supported by the DU from the set of deactivated cells.

At 625, the UE 115-*c* may transmit the DU-specific measurement report to the DU of the multiple DUs of the base station 105-*a*. In some cases, the UE 115-*c* may transmit a second DU-specific measurement report to a second DU of the multiple DUs of the base station 105-*c*. In such cases, the second DU-specific measurement report may include channel measurement results for a second subset of cells of the cell set based on performing the channel measurements. In some examples, the UE 115-*c* may transmit a DU-specific measurement report for a group of activated cells of the set of activated cells, a DU-specific measurement report for a group of deactivated cells of the set of deactivated cells, or a joint DU-specific measurement report including channel measurement results for a cell group that includes one or more activated cells supported by the DU from the set of activated cells and one or more deactivated cells supported by the DU from the set of deactivated cells.

At 630, the UE 115-*c* and the base station 105-*a* may perform a mobility procedure (such as an L1/L2 mobility procedure) based on the channel measurement results for each of the subset of cells supported by the DU of the multiple DUs of the base station 105-*a*. In some examples, the mobility procedure may include a selection, by the UE 115-*c*, of one or more cells of the configured cell set for communication with the base station 105-*a*. In some other examples, the mobility procedure may include receiving signaling from the base station 105-*a* (via one or more DUs of the base station 105-*a*) activating or deactivating one or more cells of the configured cell set for communication with the base station 105-*a*.

Figure 7:
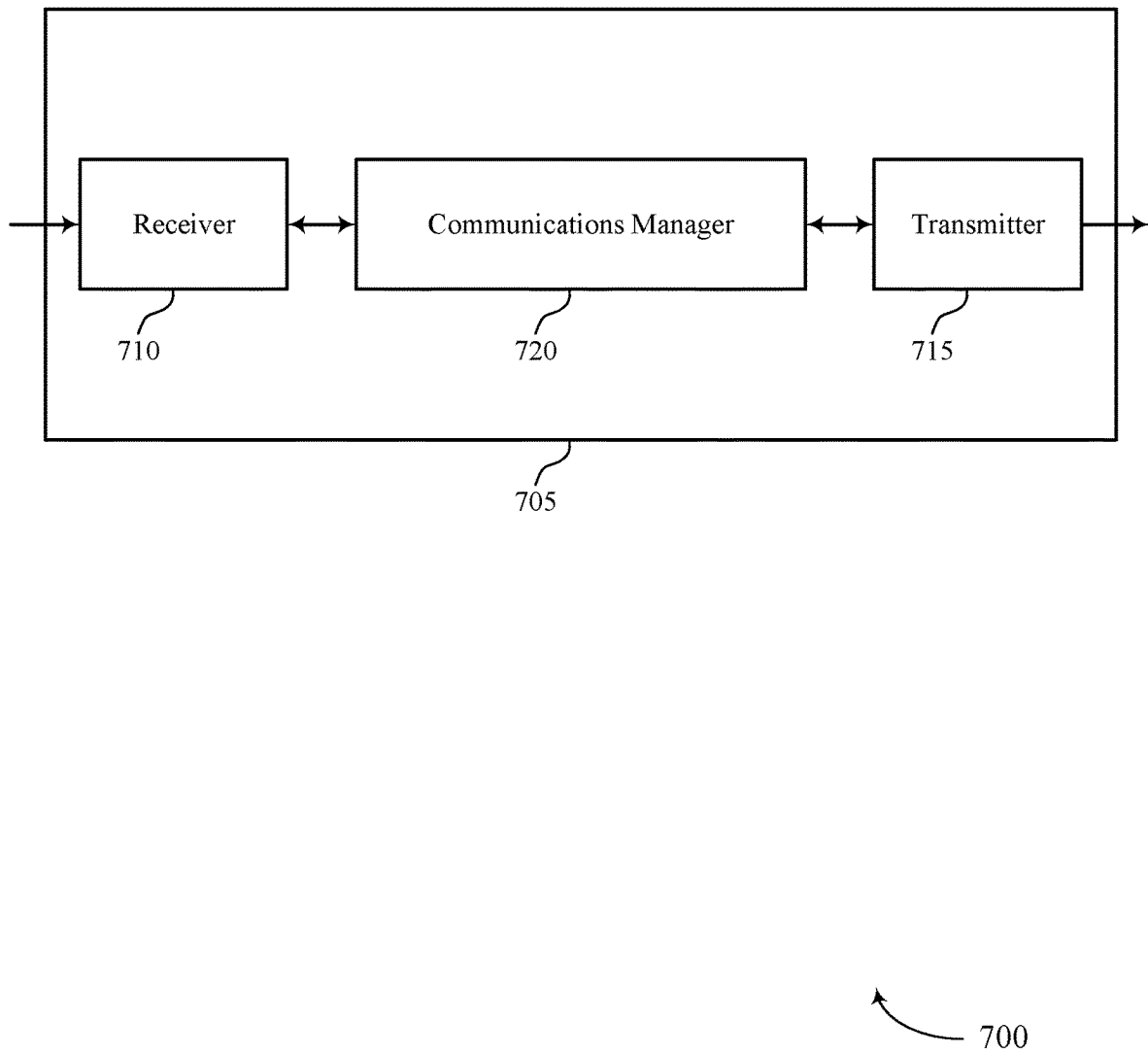
FIGS. 7 and 8 show block diagrams of devices that support cell measurement and reporting for mobility in distributed wireless communications systems in accordance with aspects of the present disclosure.

FIG. 7 shows a block diagram 700 of a device 705 that supports cell measurement and reporting for mobility in distributed wireless communications systems in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to cell measurement and reporting for mobility in distributed wireless communications systems). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to cell measurement and reporting for mobility in distributed wireless communications systems). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of cell measurement and reporting for mobility in distributed wireless communications systems as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. For example, the communications manager 720 may be configured as or otherwise support a means for receiving an indication of a cell set configured for the UE, the cell set including a set of multiple cells supported by a set of multiple DUs of a base station, where the cell set includes a set of activated cells for the UE, a set of deactivated cells for the UE, or both. The communications manager 720 may be configured as or otherwise support a means for performing, as part of a mobility procedure for the UE, channel measurements for a subset of cells of the cell set, where each of the subset of cells is supported by a DU of the set of multiple DUs. The communications manager 720 may be configured as or otherwise support a means for generating a DU-specific measurement report for the DU of the set of multiple DUs based on performing the channel measurements, the DU-specific measurement report consisting of channel measurement results for each of the subset of cells. The communications manager 720 may be configured as or otherwise support a means for transmitting, to the DU of the set of multiple DUs, the DU-specific measurement report.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for DU-specific measurement reporting for L1/L2 mobility for the device 705. Such techniques may enable the device 705 to perform L1/L2 measurements of cells configured for L1/L2 mobility for the device 705 and transmit a measurement report to a DU or other node of the system that controls the measured cells. Based on the DU-specific measurement report, different cells for the device 705 may be activated or deactivated for L1/L2 mobility, which may reduce signaling overhead for mobility procedure for the device 705, which may increase battery life and performance. Such techniques may also enable the device 705 to perform L1/L2 mobility procedures, such as beam management, without limited involvement of other nodes such as a CU in a distributed environment, which may reduce latency for the L1/L2 mobility procedures.

Figure 8:
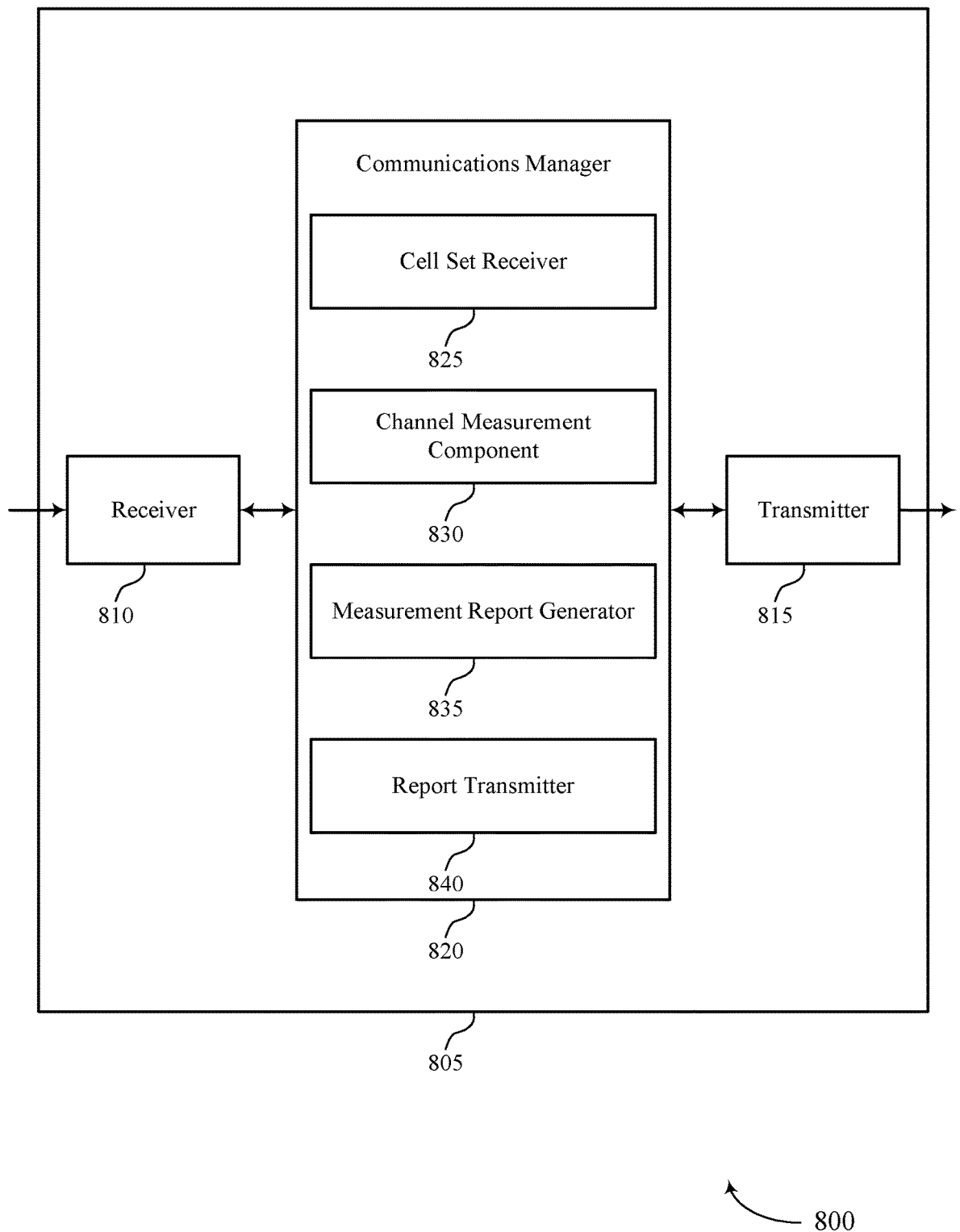

FIG. 8 shows a block diagram 800 of a device 805 that supports cell measurement and reporting for mobility in distributed wireless communications systems in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to cell measurement and reporting for mobility in distributed wireless communications systems). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to cell measurement and reporting for mobility in distributed wireless communications systems). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of cell measurement and reporting for mobility in distributed wireless communications systems as described herein. For example, the communications manager 820 may include a cell set receiver 825, a channel measurement component 830, a measurement report generator 835, a report transmitter 840, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. The cell set receiver 825 may be configured as or otherwise support a means for receiving an indication of a cell set configured for the UE, the cell set including a set of multiple cells supported by a set of multiple DUs of a base station, where the cell set includes a set of activated cells for the UE, a set of deactivated cells for the UE, or both. The channel measurement component 830 may be configured as or otherwise support a means for performing, as part of a mobility procedure for the UE, channel measurements for a subset of cells of the cell set, where each of the subset of cells is supported by a DU of the set of multiple DUs. The measurement report generator 835 may be configured as or otherwise support a means for generating a DU-specific measurement report for the DU of the set of multiple DUs based on performing the channel measurements, the DU-specific measurement report consisting of channel measurement results for each of the subset of cells. The report transmitter 840 may be configured as or otherwise support a means for transmitting, to the DU of the set of multiple DUs, the DU-specific measurement report.

Figure 9:
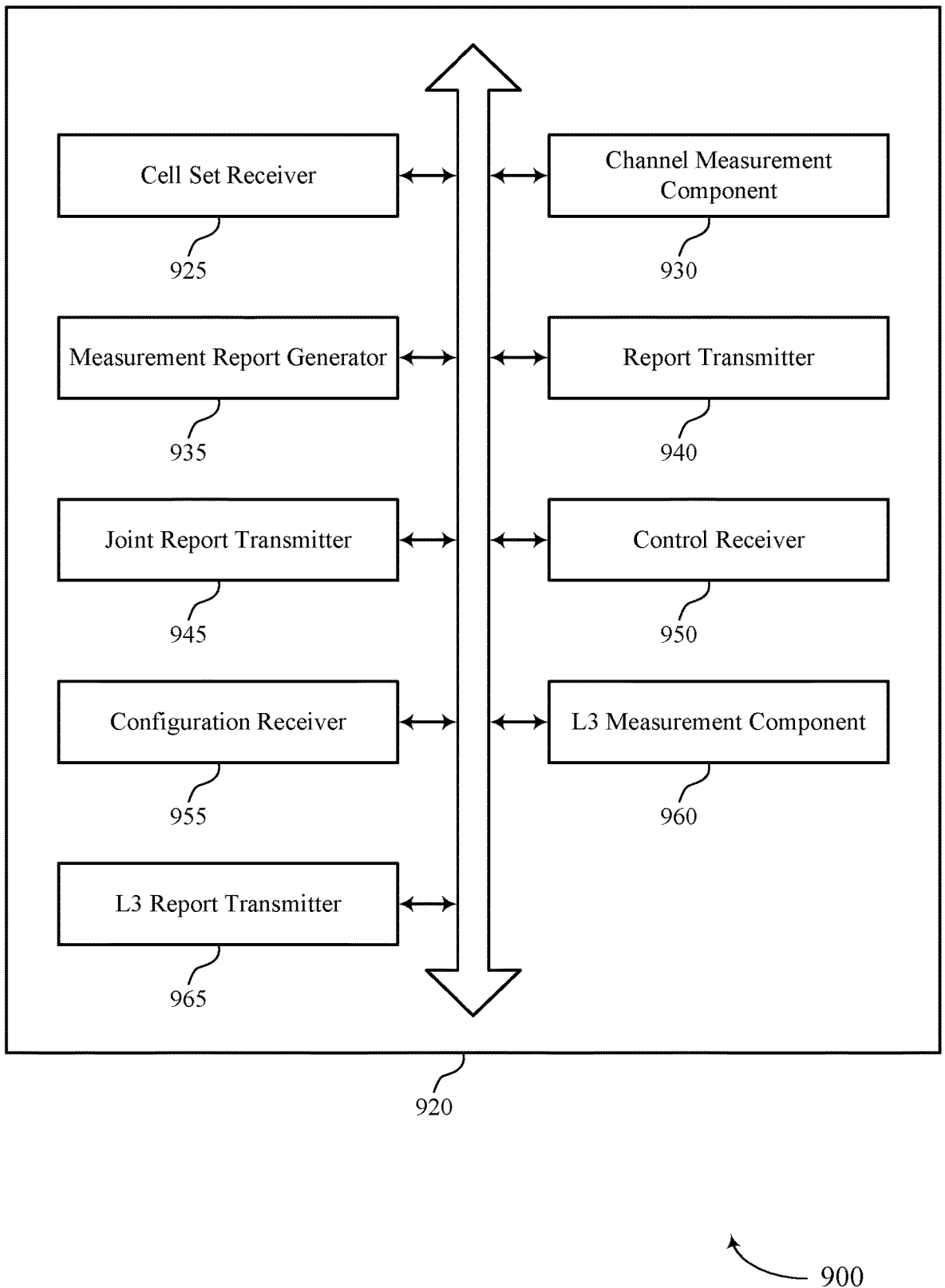
FIG. 9 shows a block diagram of a communications manager that supports cell measurement and reporting for mobility in distributed wireless communications systems in accordance with aspects of the present disclosure.

FIG. 9 shows a block diagram 900 of a communications manager 920 that supports cell measurement and reporting for mobility in distributed wireless communications systems in accordance with aspects of the present disclosure. The communications manager 920 may be an example of aspects of a communications manager 720, a communications manager 820, or both, as described herein. The communications manager 920, or various components thereof, may be an example of means for performing various aspects of cell measurement and reporting for mobility in distributed wireless communications systems as described herein. For example, the communications manager 920 may include a cell set receiver 925, a channel measurement component 930, a measurement report generator 935, a report transmitter 940, a joint report transmitter 945, a control receiver 950, a configuration receiver 955, an L3 measurement component 960, an L3 report transmitter 965, or any combination thereof. Each of these components may communicate, directly or indirectly, with one another (e.g., via one or more buses).

The communications manager 920 may support wireless communications at a UE in accordance with examples as disclosed herein. The cell set receiver 925 may be configured as or otherwise support a means for receiving an indication of a cell set configured for the UE, the cell set including a set of multiple cells supported by a set of multiple DUs of a base station, where the cell set includes a set of activated cells for the UE, a set of deactivated cells for the UE, or both. The channel measurement component 930 may be configured as or otherwise support a means for performing, as part of a mobility procedure for the UE, channel measurements for a subset of cells of the cell set, where each of the subset of cells is supported by a DU of the set of multiple DUs. The measurement report generator 935 may be configured as or otherwise support a means for generating a DU-specific measurement report for the DU of the set of multiple DUs based on performing the channel measurements, the DU-specific measurement report consisting of channel measurement results for each of the subset of cells. The report transmitter 940 may be configured as or otherwise support a means for transmitting, to the DU of the set of multiple DUs, the DU-specific measurement report.

In some examples, the report transmitter 940 may be configured as or otherwise support a means for transmitting, to a second DU of the set of multiple DUs, a second DU-specific measurement report consisting of channel measurement results for a second subset of cells of the cell set based on performing the channel measurements, where each of the second subset of cells is supported by the second DU.

In some examples, to support transmitting the DU-specific measurement report, the report transmitter 940 may be configured as or otherwise support a means for transmitting a first DU-specific measurement report to the DU, the first DU-specific measurement report including channel measurement results for each activated cell supported by the DU from the set of activated cells. In some examples, to support transmitting the DU-specific measurement report, the report transmitter 940 may be configured as or otherwise support a means for transmitting a second DU-specific measurement report to the DU, the second DU-specific measurement report including channel measurement results for each deactivated cell supported by the DU of the set of deactivated cells.

In some examples, the report transmitter 940 may be configured as or otherwise support a means for transmitting respective measurement reports for each cell of the subset of cells, each respective measurement report including a respective set of beams for a respective cell ranked according to a priority order.

In some examples, to support transmitting the DU-specific measurement report, the report transmitter 940 may be configured as or otherwise support a means for transmitting the DU-specific measurement report for a group of activated cells of the set of activated cells, the DU-specific measurement report including a set of beams for the group of activated cells ranked according to a priority order across the group of activated cells, a respective set of beams for each cell of the group of activated cells ranked according to a respective priority order for each cell, or both.

In some examples, to support transmitting the DU-specific measurement report, the report transmitter 940 may be configured as or otherwise support a means for transmitting the DU-specific measurement report for a group of deactivated cells of the set of deactivated cells, the DU-specific measurement report including a set of beams for the group of deactivated cells ranked according to a priority order across the group of deactivated cells, a respective set of beams for each cell of the group of deactivated cells ranked according to a respective priority order for each cell, a cell quality parameter for each of the group of deactivated cells, or any combination thereof.

In some examples, to support transmitting the DU-specific measurement report, the joint report transmitter 945 may be configured as or otherwise support a means for transmitting a joint DU-specific measurement report to the DU, the joint DU-specific measurement report consisting of channel measurement results for a cell group that includes one or more activated cells supported by the DU from the set of activated cells and one or more deactivated cells supported by the DU from the set of deactivated cells.

In some examples, the joint DU-specific measurement report includes a set of beams for the cell group ranked according to a priority order across the cell group, a respective set of beams for one or more cells of the cell group ranked according to a respective priority order for each of the one or more cells, a cell quality for one or more cells of the cell group, or any combination thereof.

In some examples, the joint report transmitter 945 may be configured as or otherwise support a means for receiving, from the DU, a control message that indicates the cell group for reporting in the joint DU-specific measurement report, where the cell group corresponds to a first RRC connection and is different from a second cell group corresponding to a second RRC connection.

In some examples, the control receiver 950 may be configured as or otherwise support a means for receiving, from the DU, a control message that indicates the subset of cells for reporting in the DU-specific measurement report, where the subset of cells corresponds to a first RRC connection and is different from a second subset of cells corresponding to a second RRC connection.

In some examples, the configuration receiver 955 may be configured as or otherwise support a means for receiving, from the DU, a reporting configuration for the DU-specific measurement report, the reporting configuration indicating the subset of cells for reporting, a number of beams for reporting, a number of cells for reporting, a periodicity associated with reporting, a trigger for reporting, or any combination thereof.

In some examples, the reporting configuration corresponds to a first type of reporting different from a second configuration that corresponds to a second type of reporting.

In some examples, to support transmitting the DU-specific measurement report, the report transmitter 940 may be configured as or otherwise support a means for transmitting the DU-specific measurement report using L1 or L2 signaling.

In some examples, to support performing the channel measurements, the channel measurement component 930 may be configured as or otherwise support a means for performing L1 or L2 measurements for each cell of the subset of cells.

In some examples, the L3 measurement component 960 may be configured as or otherwise support a means for performing L3 channel measurements for one or more neighboring cells, where the cell set excludes the one or more neighboring cells. In some examples, the L3 report transmitter 965 may be configured as or otherwise support a means for transmitting an L3 measurement report including the L3 channel measurements for the one or more neighboring cells. In some examples, the configuration receiver 955 may be configured as or otherwise support a means for receiving a configuration message indicating an updated cell set for the UE based on the L3 measurement report, where the updated cell set includes at least one of the one or more neighboring cells.

Figure 10:
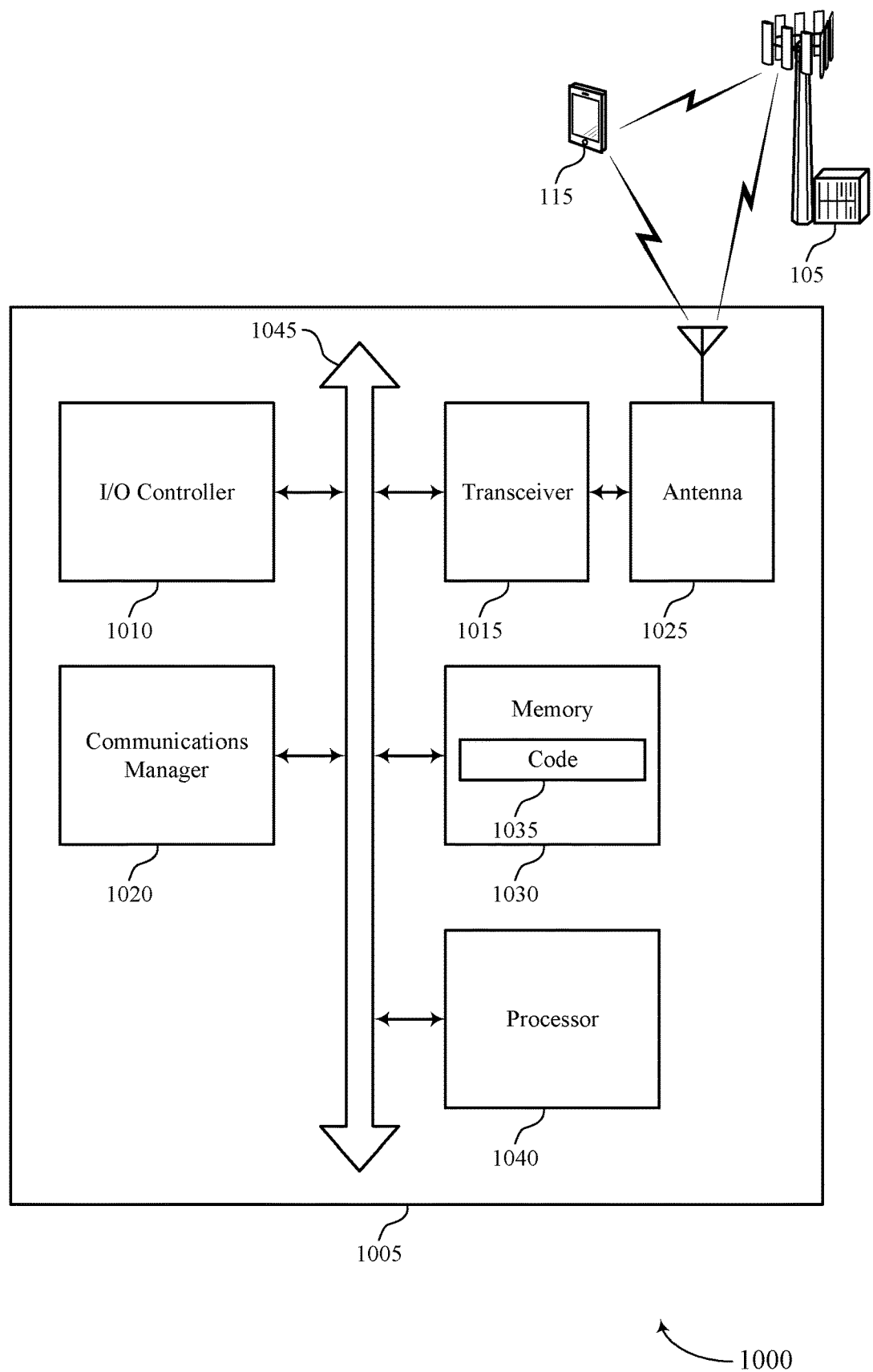
FIG. 10 shows a diagram of a system including a device that supports cell measurement and reporting for mobility in distributed wireless communications systems in accordance with aspects of the present disclosure.

FIG. 10 shows a diagram of a system 1000 including a device 1005 that supports cell measurement and reporting for mobility in distributed wireless communications systems in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting cell measurement and reporting for mobility in distributed wireless communications systems). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for receiving an indication of a cell set configured for the UE, the cell set including a set of multiple cells supported by a set of multiple DUs of a base station, where the cell set includes a set of activated cells for the UE, a set of deactivated cells for the UE, or both. The communications manager 1020 may be configured as or otherwise support a means for performing, as part of a mobility procedure for the UE, channel measurements for a subset of cells of the cell set, where each of the subset of cells is supported by a DU of the set of multiple DUs. The communications manager 1020 may be configured as or otherwise support a means for generating a DU-specific measurement report for the DU of the set of multiple DUs based on performing the channel measurements, the DU-specific measurement report consisting of channel measurement results for each of the subset of cells. The communications manager 1020 may be configured as or otherwise support a means for transmitting, to the DU of the set of multiple DUs, the DU-specific measurement report.

By including or configuring the communications manager 1020 in accordance with examples as described herein, the device 1005 may support techniques for DU-specific measurement reporting for L1/L2 mobility, which may allow for improved communication reliability, reduced latency, longer battery life, and improved utilization of processing capability.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of cell measurement and reporting for mobility in distributed wireless communications systems as described herein, or the processor 1040 and the memory 1030 may be otherwise configured to perform or support such operations.

Figure 11:
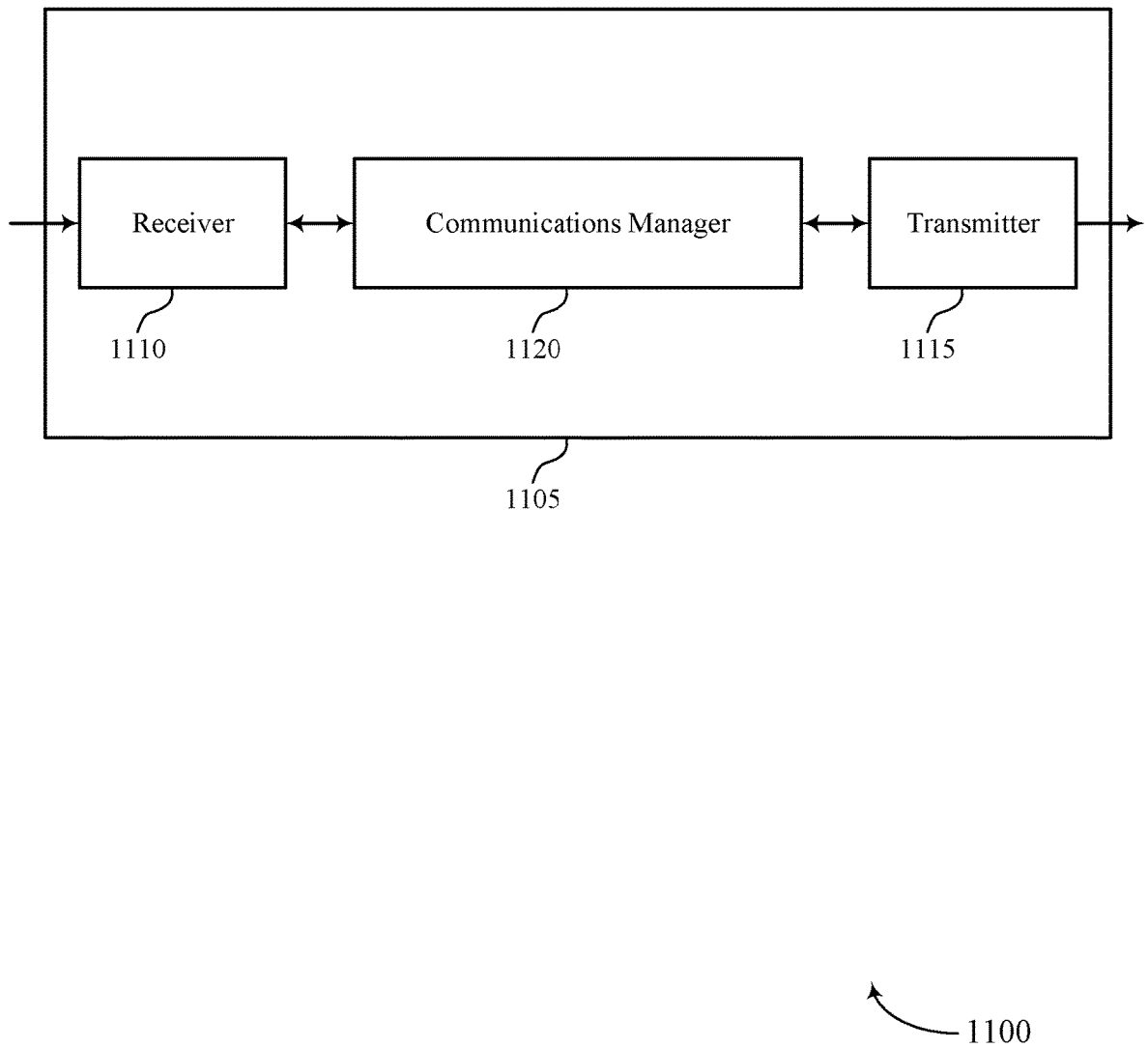
FIGS. 11 and 12 show block diagrams of devices that support cell measurement and reporting for mobility in distributed wireless communications systems in accordance with aspects of the present disclosure.

FIG. 11 shows a block diagram 1100 of a device 1105 that supports cell measurement and reporting for mobility in distributed wireless communications systems in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to cell measurement and reporting for mobility in distributed wireless communications systems). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to cell measurement and reporting for mobility in distributed wireless communications systems). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of cell measurement and reporting for mobility in distributed wireless communications systems as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a DU of a base station in accordance with examples as disclosed herein. For example, the communications manager 1120 may be configured as or otherwise support a means for transmitting, to a UE, an indication of a cell set configured for a mobility procedure for the UE, the cell set including a set of multiple cells supported by a set of multiple DUs including the DU, the cell set including a set of activated cells for the UE, a set of deactivated cells for the UE, or both. The communications manager 1120 may be configured as or otherwise support a means for transmitting, to the UE, a reporting configuration for reporting measurements for the mobility procedure by the UE, the reporting configuration indicating a subset of cells supported by the DU for reporting. The communications manager 1120 may be configured as or otherwise support a means for receiving, from the UE, a DU-specific measurement report for the DU that consists of channel measurement results for the subset of cells based on the reporting configuration.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for DU-specific measurement reporting for L1/L2 mobility, which may involve reduced processing and signaling overhead, and reduced power consumption.

Figure 12:
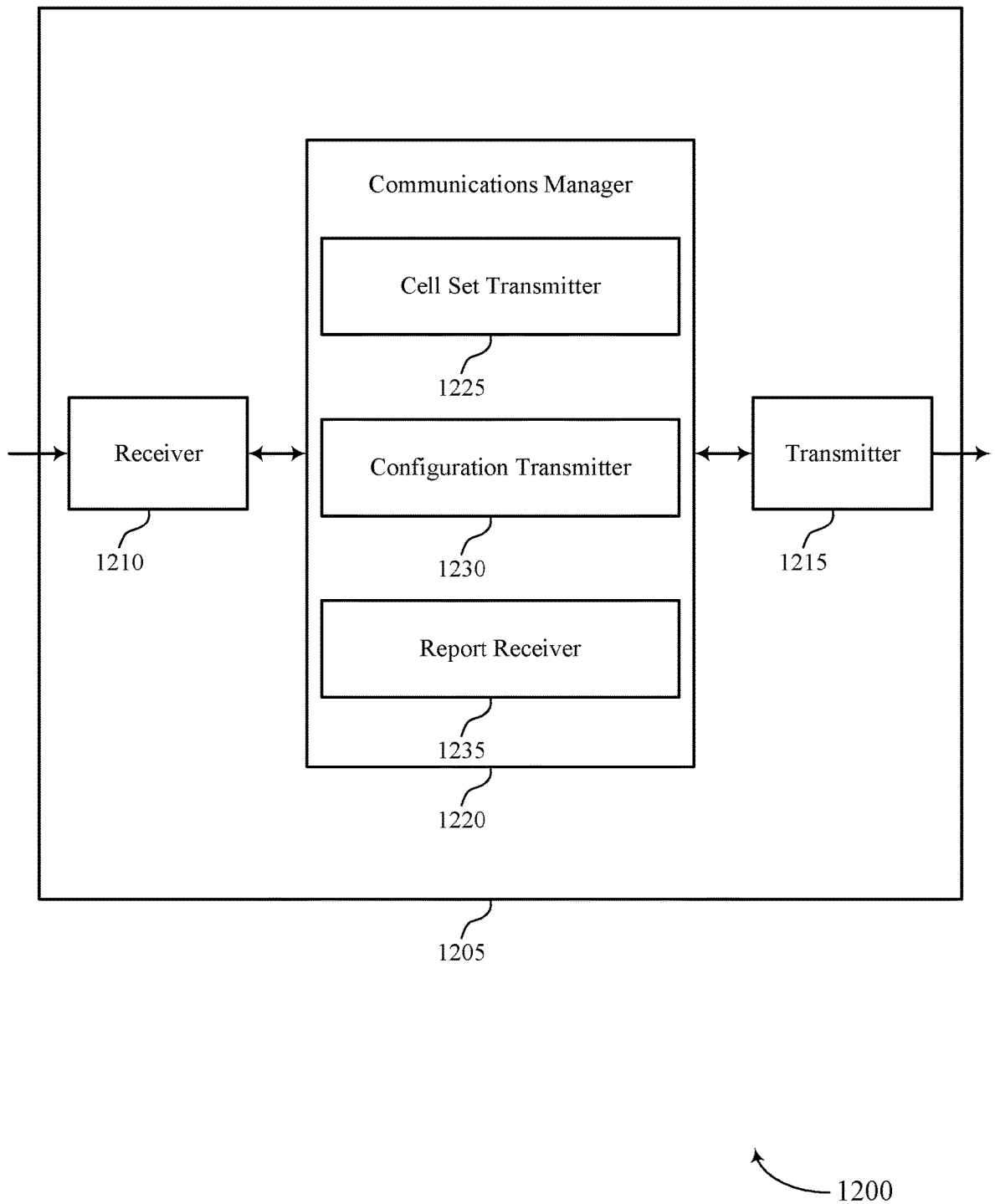

FIG. 12 shows a block diagram 1200 of a device 1205 that supports cell measurement and reporting for mobility in distributed wireless communications systems in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to cell measurement and reporting for mobility in distributed wireless communications systems). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to cell measurement and reporting for mobility in distributed wireless communications systems). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of cell measurement and reporting for mobility in distributed wireless communications systems as described herein. For example, the communications manager 1220 may include a cell set transmitter 1225, a configuration transmitter 1230, a report receiver 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a DU of a base station in accordance with examples as disclosed herein. The cell set transmitter 1225 may be configured as or otherwise support a means for transmitting, to a UE, an indication of a cell set configured for a mobility procedure for the UE, the cell set including a set of multiple cells supported by a set of multiple DUs including the DU, the cell set including a set of activated cells for the UE, a set of deactivated cells for the UE, or both. The configuration transmitter 1230 may be configured as or otherwise support a means for transmitting, to the UE, a reporting configuration for reporting measurements for the mobility procedure by the UE, the reporting configuration indicating a subset of cells supported by the DU for reporting. The report receiver 1235 may be configured as or otherwise support a means for receiving, from the UE, a DU-specific measurement report for the DU that consists of channel measurement results for the subset of cells based on the reporting configuration.

Figure 13:
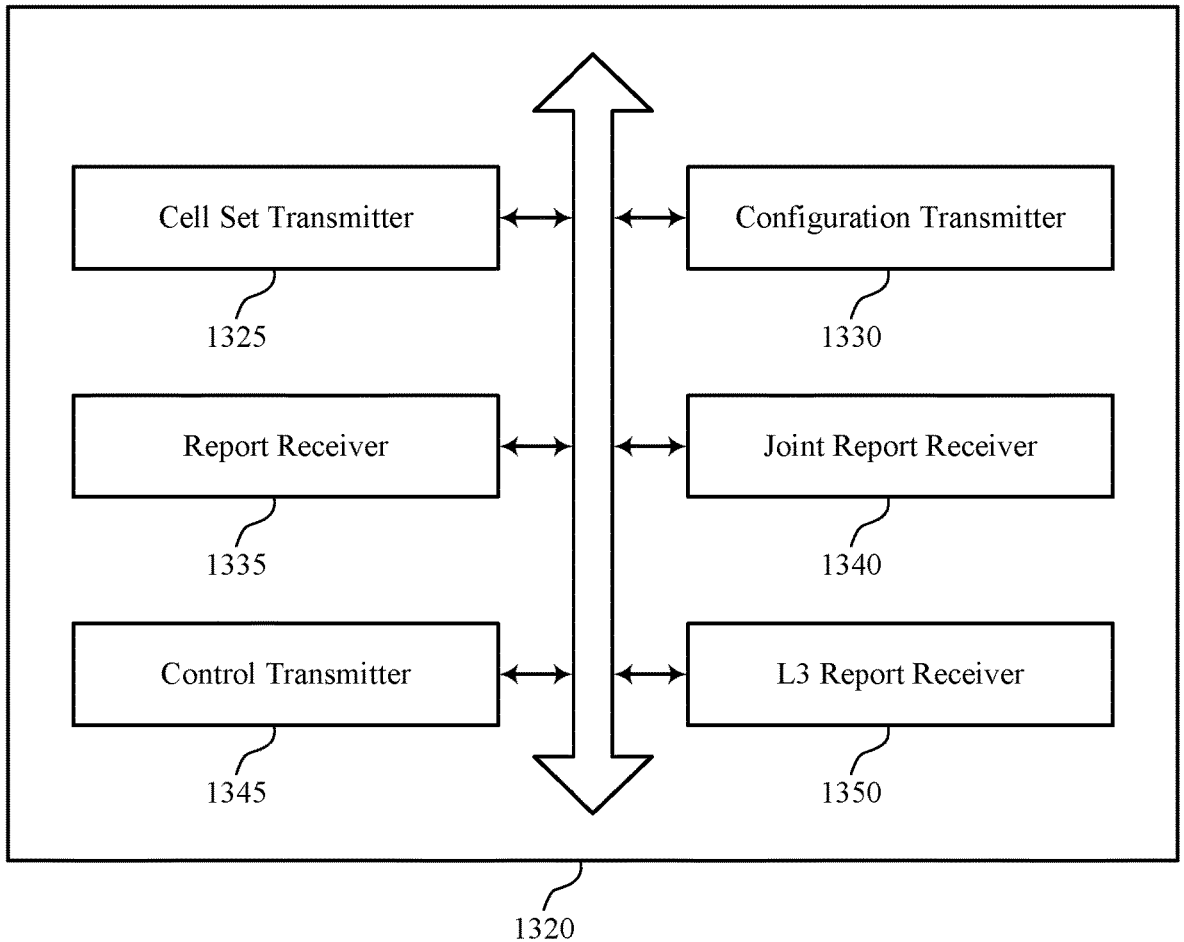
FIG. 13 shows a block diagram of a communications manager that supports cell measurement and reporting for mobility in distributed wireless communications systems in accordance with aspects of the present disclosure.

FIG. 13 shows a block diagram 1300 of a communications manager 1320 that supports cell measurement and reporting for mobility in distributed wireless communications systems in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of cell measurement and reporting for mobility in distributed wireless communications systems as described herein. For example, the communications manager 1320 may include a cell set transmitter 1325, a configuration transmitter 1330, a report receiver 1335, a joint report receiver 1340, a control transmitter 1345, an L3 report receiver 1350, or any combination thereof. Each of these components may communicate, directly or indirectly, with one another (e.g., via one or more buses).

The communications manager 1320 may support wireless communications at a DU of a base station in accordance with examples as disclosed herein. The cell set transmitter 1325 may be configured as or otherwise support a means for transmitting, to a UE, an indication of a cell set configured for a mobility procedure for the UE, the cell set including a set of multiple cells supported by a set of multiple DUs including the DU, the cell set including a set of activated cells for the UE, a set of deactivated cells for the UE, or both. The configuration transmitter 1330 may be configured as or otherwise support a means for transmitting, to the UE, a reporting configuration for reporting measurements for the mobility procedure by the UE, the reporting configuration indicating a subset of cells supported by the DU for reporting. The report receiver 1335 may be configured as or otherwise support a means for receiving, from the UE, a DU-specific measurement report for the DU that consists of channel measurement results for the subset of cells based on the reporting configuration.

In some examples, to support receiving the DU-specific measurement report, the report receiver 1335 may be configured as or otherwise support a means for receiving a first DU-specific measurement report including channel measurement results for each activated cell supported by the DU of the set of activated cells. In some examples, to support receiving the DU-specific measurement report, the report receiver 1335 may be configured as or otherwise support a means for receiving a second DU-specific measurement report including channel measurement results for each deactivated cell supported by the DU of the set of deactivated cells.

In some examples, the report receiver 1335 may be configured as or otherwise support a means for receiving respective DU-specific measurement reports for respective cells of the subset of cells supported by the DU, each DU-specific measurement report including a respective set of beams for a respective cell ranked according to a priority order.

In some examples, to support receiving the DU-specific measurement report, the report receiver 1335 may be configured as or otherwise support a means for receiving the DU-specific measurement report for a group of activated cells of the set of activated cells, the DU-specific measurement report including a set of beams for the group of activated cells ranked according to a priority order across the group of activated cells, a respective set of beams for each cell of the group of activated cells ranked according to a respective priority order for each cell, or both.

In some examples, to support receiving the DU-specific measurement report, the report receiver 1335 may be configured as or otherwise support a means for receiving the DU-specific measurement report for a group of deactivated cells of the set of deactivated cells, the DU-specific measurement report including a set of beams for the group of deactivated cells ranked according to a priority order across the group of deactivated cells, a respective set of beams for each cell of the group of deactivated cells ranked according to a respective priority order for each cell, a cell quality parameter for each of the group of deactivated cells, or any combination thereof.

In some examples, to support receiving the DU-specific measurement report, the joint report receiver 1340 may be configured as or otherwise support a means for receiving a joint DU-specific measurement report from the UE, the joint DU-specific measurement report including channel measurement results for a cell group that includes one or more activated cells supported by the DU from the set of activated cells and one or more deactivated cells supported by the DU from the set of deactivated cells.

In some examples, the joint DU-specific measurement report includes a set of beams for the cell group ranked according to a priority order across the cell group, a respective set of beams for one or more cells of the cell group ranked according to a respective priority order for each of the one or more cells, a cell quality for one or more cells of the cell group, or any combination thereof.

In some examples, the control transmitter 1345 may be configured as or otherwise support a means for transmitting, to the UE, a control message that indicates the subset of cells for reporting in the DU-specific measurement report, where the subset of cells corresponds to a first RRC connection and is different from a second subset of cells corresponding to a second RRC connection.

In some examples, to support receiving the DU-specific measurement report, the report receiver 1335 may be configured as or otherwise support a means for receiving the DU-specific measurement report using L1 or L2 signaling.

In some examples, the L3 report receiver 1350 may be configured as or otherwise support a means for receiving, from the UE, an L3 measurement report including a set of L3 channel measurements for one or more neighboring cells of the UE. In some examples, the configuration transmitter 1330 may be configured as or otherwise support a means for transmitting a configuration message to the UE indicating an updated cell set for the UE based on the L3 measurement report, where the updated cell set includes at least one of the one or more neighboring cells.

Figure 14:
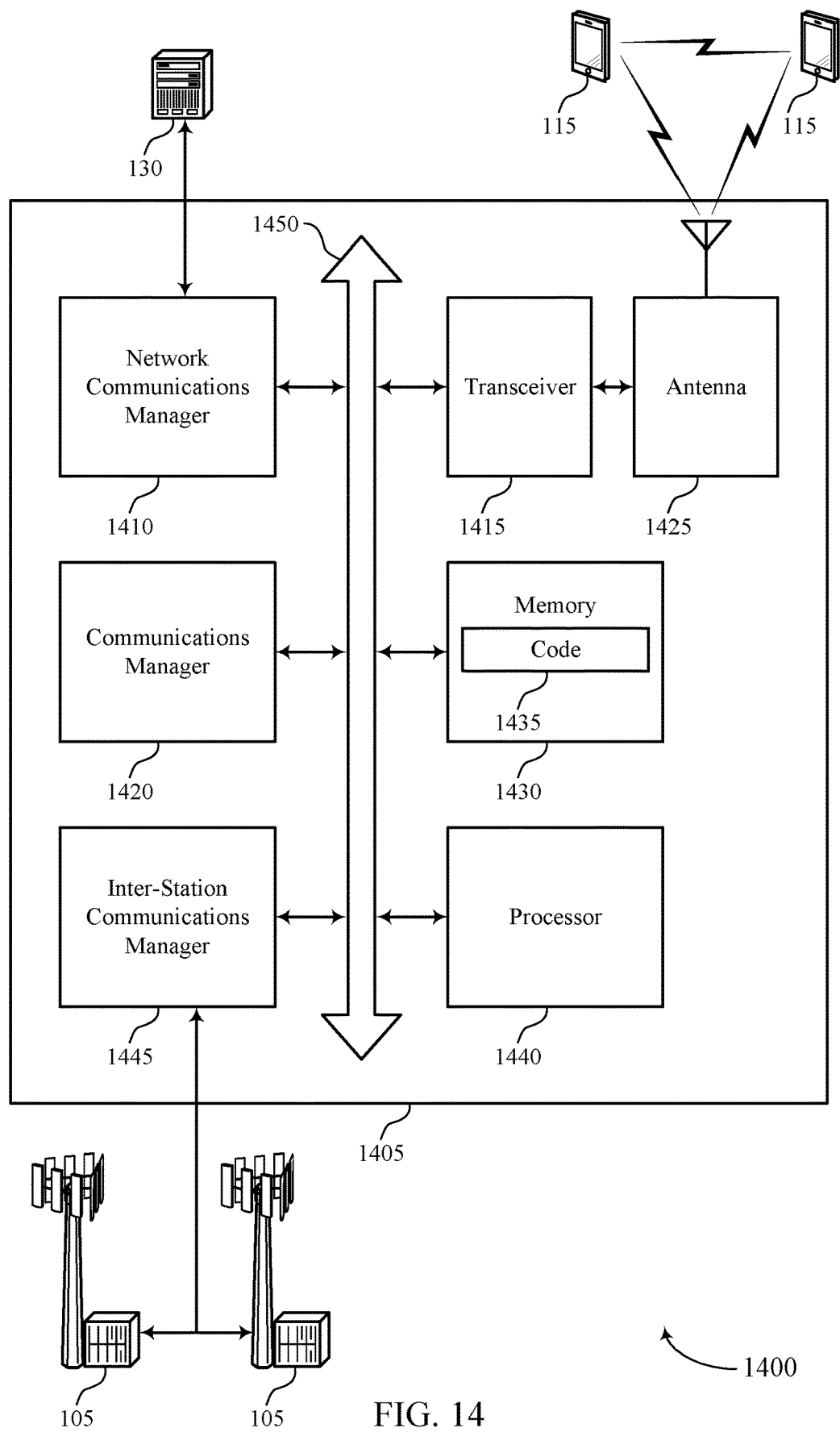
FIG. 14 shows a diagram of a system including a device that supports cell measurement and reporting for mobility in distributed wireless communications systems in accordance with aspects of the present disclosure.

FIG. 14 shows a diagram of a system 1400 including a device 1405 that supports cell measurement and reporting for mobility in distributed wireless communications systems in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting cell measurement and reporting for mobility in distributed wireless communications systems). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communications at a DU of a base station in accordance with examples as disclosed herein. For example, the communications manager 1420 may be configured as or otherwise support a means for transmitting, to a UE, an indication of a cell set configured for a mobility procedure for the UE, the cell set including a set of multiple cells supported by a set of multiple DUs including the DU, the cell set including a set of activated cells for the UE, a set of deactivated cells for the UE, or both. The communications manager 1420 may be configured as or otherwise support a means for transmitting, to the UE, a reporting configuration for reporting measurements for the mobility procedure by the UE, the reporting configuration indicating a subset of cells supported by the DU for reporting. The communications manager 1420 may be configured as or otherwise support a means for receiving, from the UE, a DU-specific measurement report for the DU that consists of channel measurement results for the subset of cells based on the reporting configuration.

By including or configuring the communications manager 1420 in accordance with examples as described herein, the device 1405 may support techniques that enable a DU associated with the device 1405 to perform L1/L2 mobility procedures for a UE based on DU-specific measurements. The DU-specific measurements may include uplink measurements at the DU using reference signals received from the UE or may include downlink measurements received at the DU from the UE where the downlink measurements are included in a DU-specific measurement report for cells supported by the DU. Such techniques may reduce latency and signaling overhead associated with UE mobility, which may increase system performance.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of cell measurement and reporting for mobility in distributed wireless communications systems as described herein, or the processor 1440 and the memory 1430 may be otherwise configured to perform or support such operations.

Figure 15:
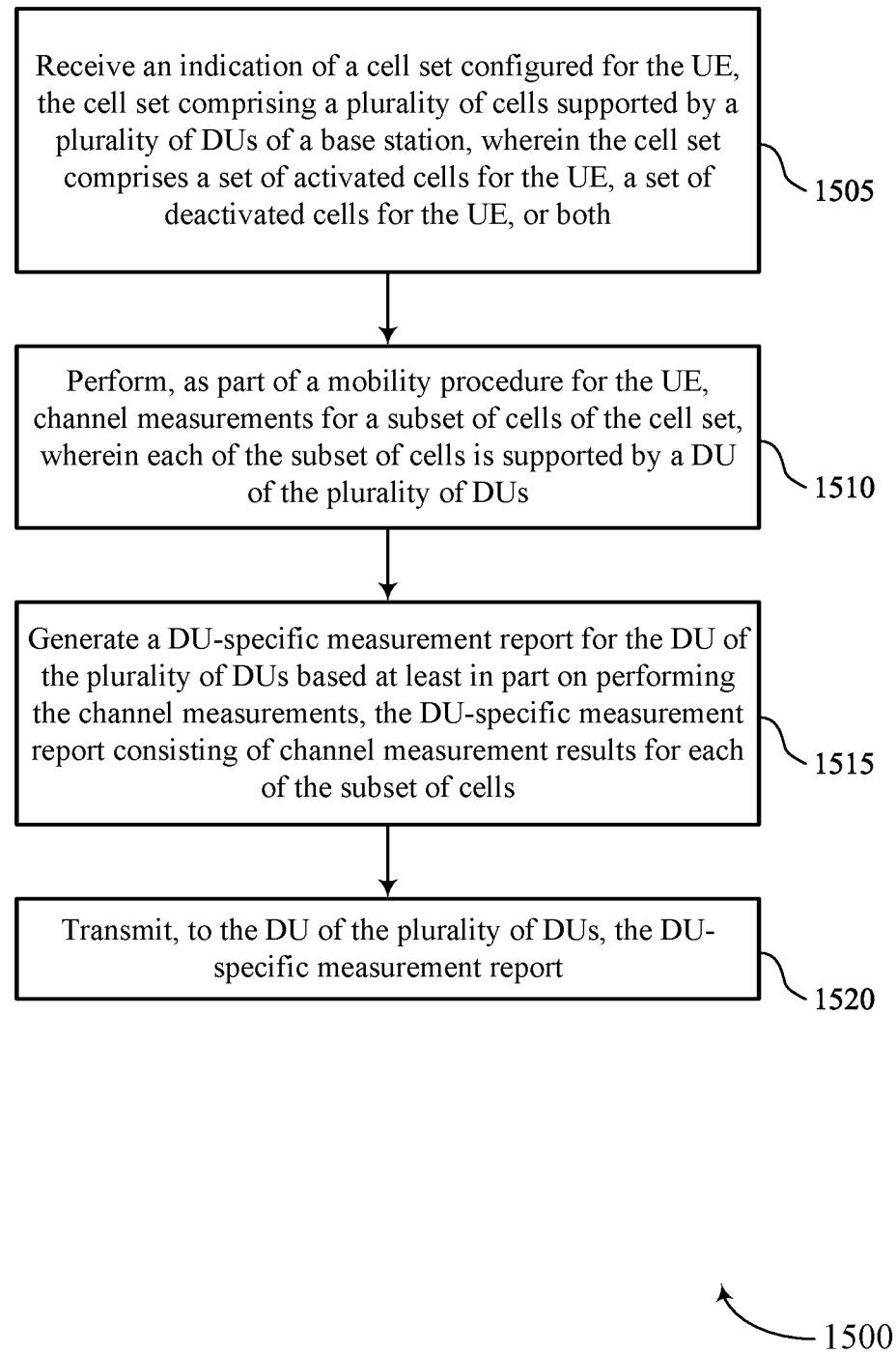
FIGS. 15 through 20 show flowcharts illustrating methods that support cell measurement and reporting for mobility in distributed wireless communications systems in accordance with aspects of the present disclosure.

FIG. 15 shows a flowchart illustrating a method 1500 that supports cell measurement and reporting for mobility in distributed wireless communications systems in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving an indication of a cell set configured for the UE, the cell set including a set of multiple cells supported by a set of multiple DUs of a base station, where the cell set includes a set of activated cells for the UE, a set of deactivated cells for the UE, or both. The operations of 1505 may be performed in accordance with examples as disclosed herein. In some examples, aspects of the operations of 1505 may be performed by a cell set receiver 925 as described with reference to FIG. 9.

At 1510, the method may include performing, as part of a mobility procedure for the UE, channel measurements for a subset of cells of the cell set, where each of the subset of cells is supported by a DU of the set of multiple DUs. The operations of 1510 may be performed in accordance with examples as disclosed herein. In some examples, aspects of the operations of 1510 may be performed by a channel measurement component 930 as described with reference to FIG. 9.

At 1515, the method may include generating a DU-specific measurement report for the DU of the set of multiple DUs based on performing the channel measurements, the DU-specific measurement report consisting of channel measurement results for each of the subset of cells. The operations of 1515 may be performed in accordance with examples as disclosed herein. In some examples, aspects of the operations of 1515 may be performed by a measurement report generator 935 as described with reference to FIG. 9.

At 1520, the method may include transmitting, to the DU of the set of multiple DUs, the DU-specific measurement report. The operations of 1520 may be performed in accordance with examples as disclosed herein. In some examples, aspects of the operations of 1520 may be performed by a report transmitter 940 as described with reference to FIG. 9.

Figure 16:
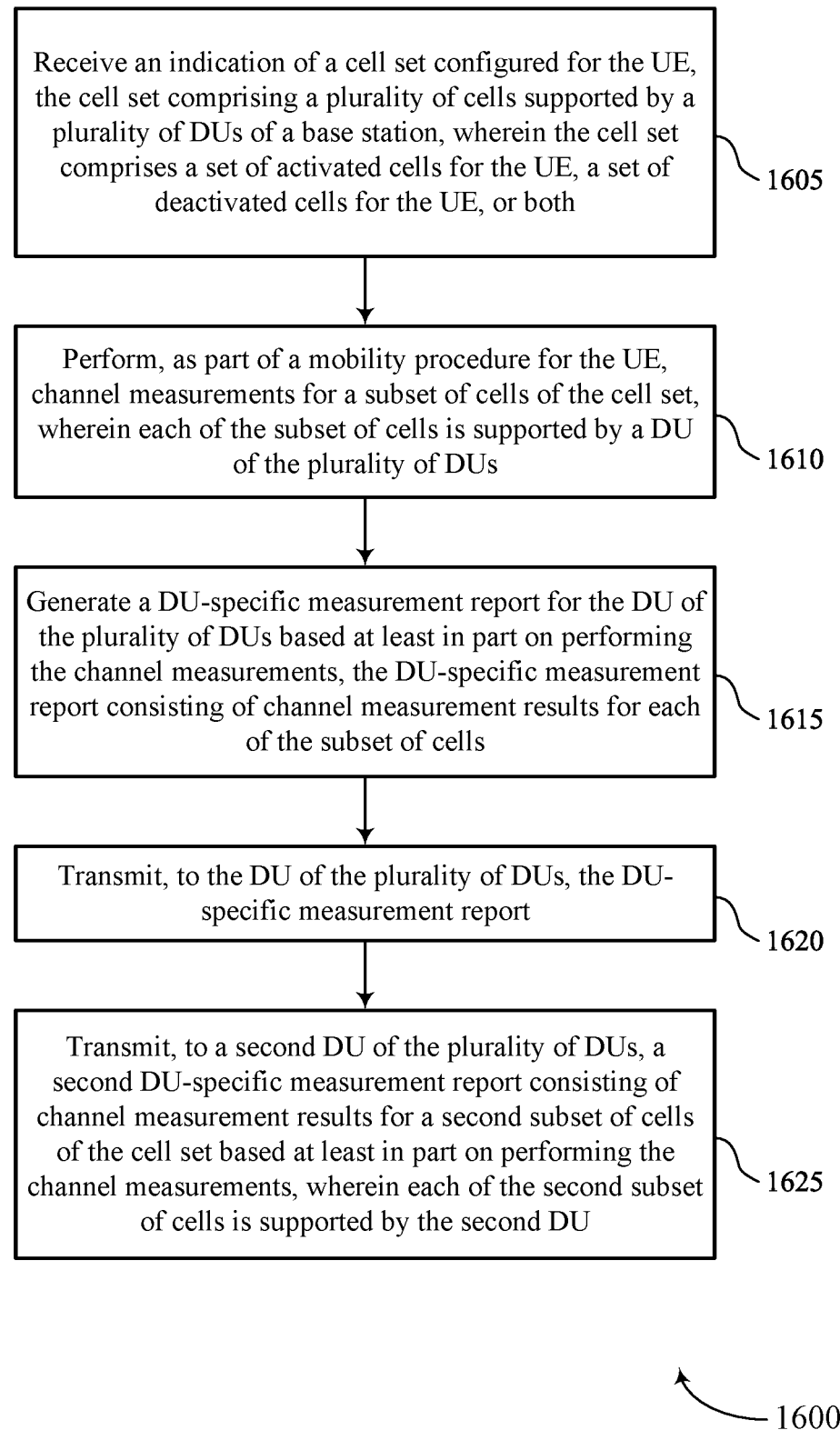

FIG. 16 shows a flowchart illustrating a method 1600 that supports cell measurement and reporting for mobility in distributed wireless communications systems in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving an indication of a cell set configured for the UE, the cell set including a set of multiple cells supported by a set of multiple DUs of a base station, where the cell set includes a set of activated cells for the UE, a set of deactivated cells for the UE, or both. The operations of 1605 may be performed in accordance with examples as disclosed herein. In some examples, aspects of the operations of 1605 may be performed by a cell set receiver 925 as described with reference to FIG. 9.

At 1610, the method may include performing, as part of a mobility procedure for the UE, channel measurements for a subset of cells of the cell set, where each of the subset of cells is supported by a DU of the set of multiple DUs. The operations of 1610 may be performed in accordance with examples as disclosed herein. In some examples, aspects of the operations of 1610 may be performed by a channel measurement component 930 as described with reference to FIG. 9.

At 1615, the method may include generating a DU-specific measurement report for the DU of the set of multiple DUs based on performing the channel measurements, the DU-specific measurement report consisting of channel measurement results for each of the subset of cells. The operations of 1615 may be performed in accordance with examples as disclosed herein. In some examples, aspects of the operations of 1615 may be performed by a measurement report generator 935 as described with reference to FIG. 9.

At 1620, the method may include transmitting, to the DU of the set of multiple DUs, the DU-specific measurement report. The operations of 1620 may be performed in accordance with examples as disclosed herein. In some examples, aspects of the operations of 1620 may be performed by a report transmitter 940 as described with reference to FIG. 9.

At 1625, the method may include transmitting, to a second DU of the set of multiple DUs, a second DU-specific measurement report consisting of channel measurement results for a second subset of cells of the cell set based on performing the channel measurements, where each of the second subset of cells is supported by the second DU. The operations of 1625 may be performed in accordance with examples as disclosed herein. In some examples, aspects of the operations of 1625 may be performed by a report transmitter 940 as described with reference to FIG. 9.

Figure 17:
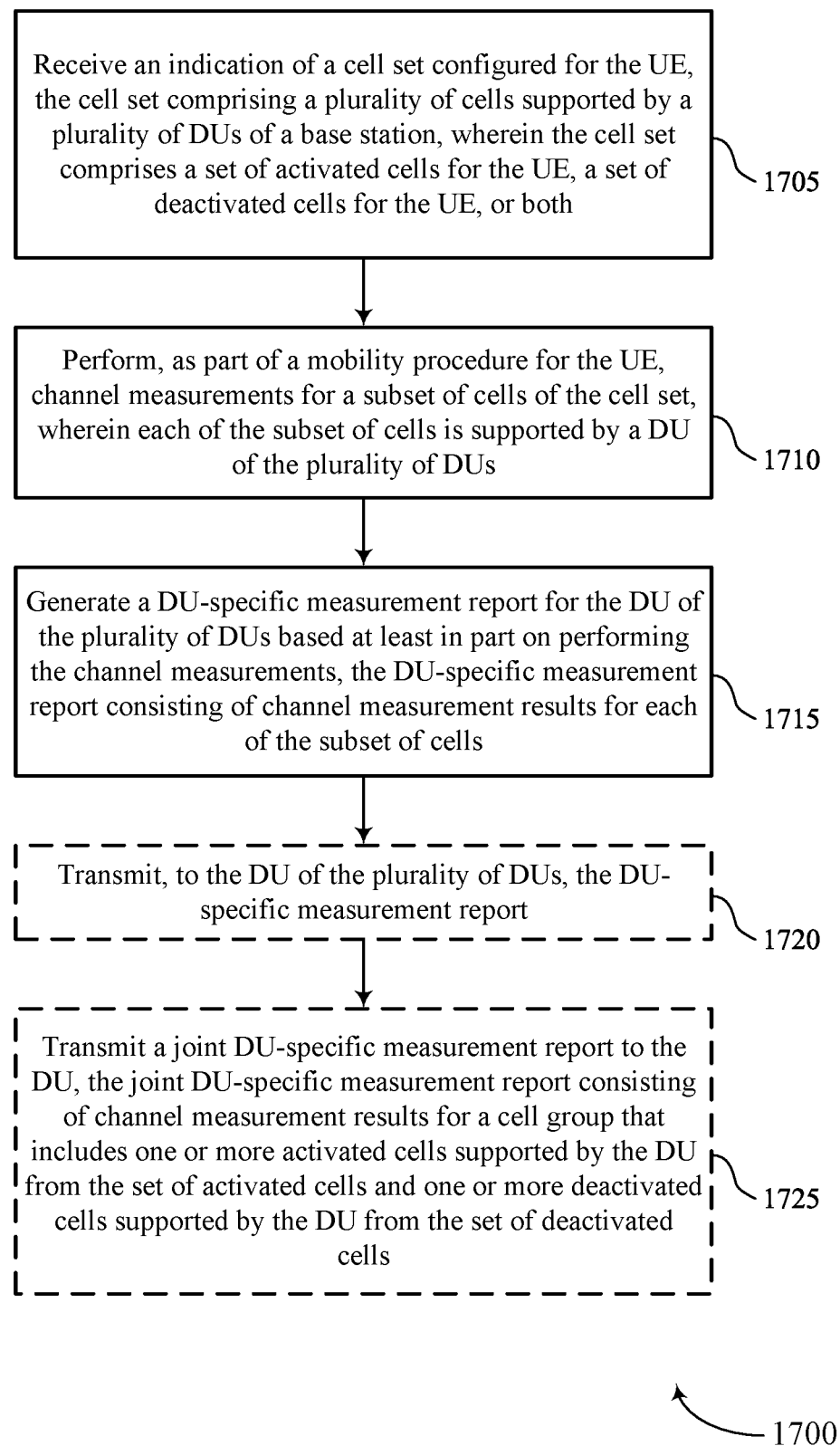

FIG. 17 shows a flowchart illustrating a method 1700 that supports cell measurement and reporting for mobility in distributed wireless communications systems in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include receiving an indication of a cell set configured for the UE, the cell set including a set of multiple cells supported by a set of multiple DUs of a base station, where the cell set includes a set of activated cells for the UE, a set of deactivated cells for the UE, or both. The operations of 1705 may be performed in accordance with examples as disclosed herein. In some examples, aspects of the operations of 1705 may be performed by a cell set receiver 925 as described with reference to FIG. 9.

At 1710, the method may include performing, as part of a mobility procedure for the UE, channel measurements for a subset of cells of the cell set, where each of the subset of cells is supported by a DU of the set of multiple DUs. The operations of 1710 may be performed in accordance with examples as disclosed herein. In some examples, aspects of the operations of 1710 may be performed by a channel measurement component 930 as described with reference to FIG. 9.

At 1715, the method may include generating a DU-specific measurement report for the DU of the set of multiple DUs based on performing the channel measurements, the DU-specific measurement report consisting of channel measurement results for each of the subset of cells. The operations of 1715 may be performed in accordance with examples as disclosed herein. In some examples, aspects of the operations of 1715 may be performed by a measurement report generator 935 as described with reference to FIG. 9.

At 1720, the method may optionally include transmitting, to the DU of the set of multiple DUs, the DU-specific measurement report. The operations of 1720 may be performed in accordance with examples as disclosed herein. In some examples, aspects of the operations of 1720 may be performed by a report transmitter 940 as described with reference to FIG. 9.

At 1725, the method may optionally include transmitting a joint DU-specific measurement report to the DU, the joint DU-specific measurement report consisting of channel measurement results for a cell group that includes one or more activated cells supported by the DU from the set of activated cells and one or more deactivated cells supported by the DU from the set of deactivated cells. The operations of 1725 may be performed in accordance with examples as disclosed herein. In some examples, aspects of the operations of 1725 may be performed by a joint report transmitter 945 as described with reference to FIG. 9.

Figure 18:
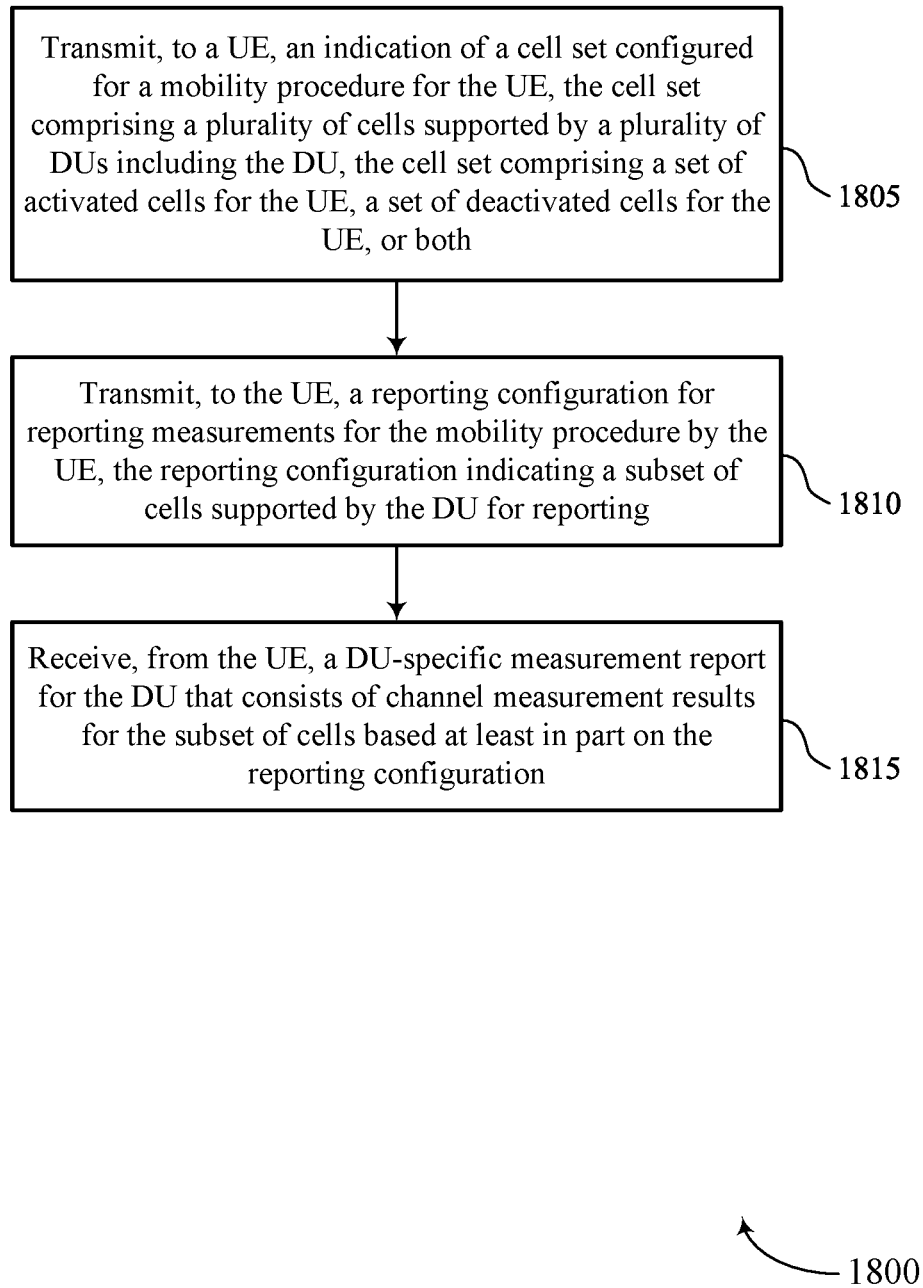

FIG. 18 shows a flowchart illustrating a method 1800 that supports cell measurement and reporting for mobility in distributed wireless communications systems in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE, an indication of a cell set configured for a mobility procedure for the UE, the cell set including a set of multiple cells supported by a set of multiple DUs including the DU, the cell set including a set of activated cells for the UE, a set of deactivated cells for the UE, or both. The operations of 1805 may be performed in accordance with examples as disclosed herein. In some examples, aspects of the operations of 1805 may be performed by a cell set transmitter 1325 as described with reference to FIG. 13.

At 1810, the method may include transmitting, to the UE, a reporting configuration for reporting measurements for the mobility procedure by the UE, the reporting configuration indicating a subset of cells supported by the DU for reporting. The operations of 1810 may be performed in accordance with examples as disclosed herein. In some examples, aspects of the operations of 1810 may be performed by a configuration transmitter 1330 as described with reference to FIG. 13.

At 1815, the method may include receiving, from the UE, a DU-specific measurement report for the DU that consists of channel measurement results for the subset of cells based on the reporting configuration. The operations of 1815 may be performed in accordance with examples as disclosed herein. In some examples, aspects of the operations of 1815 may be performed by a report receiver 1335 as described with reference to FIG. 13.

Figure 19:
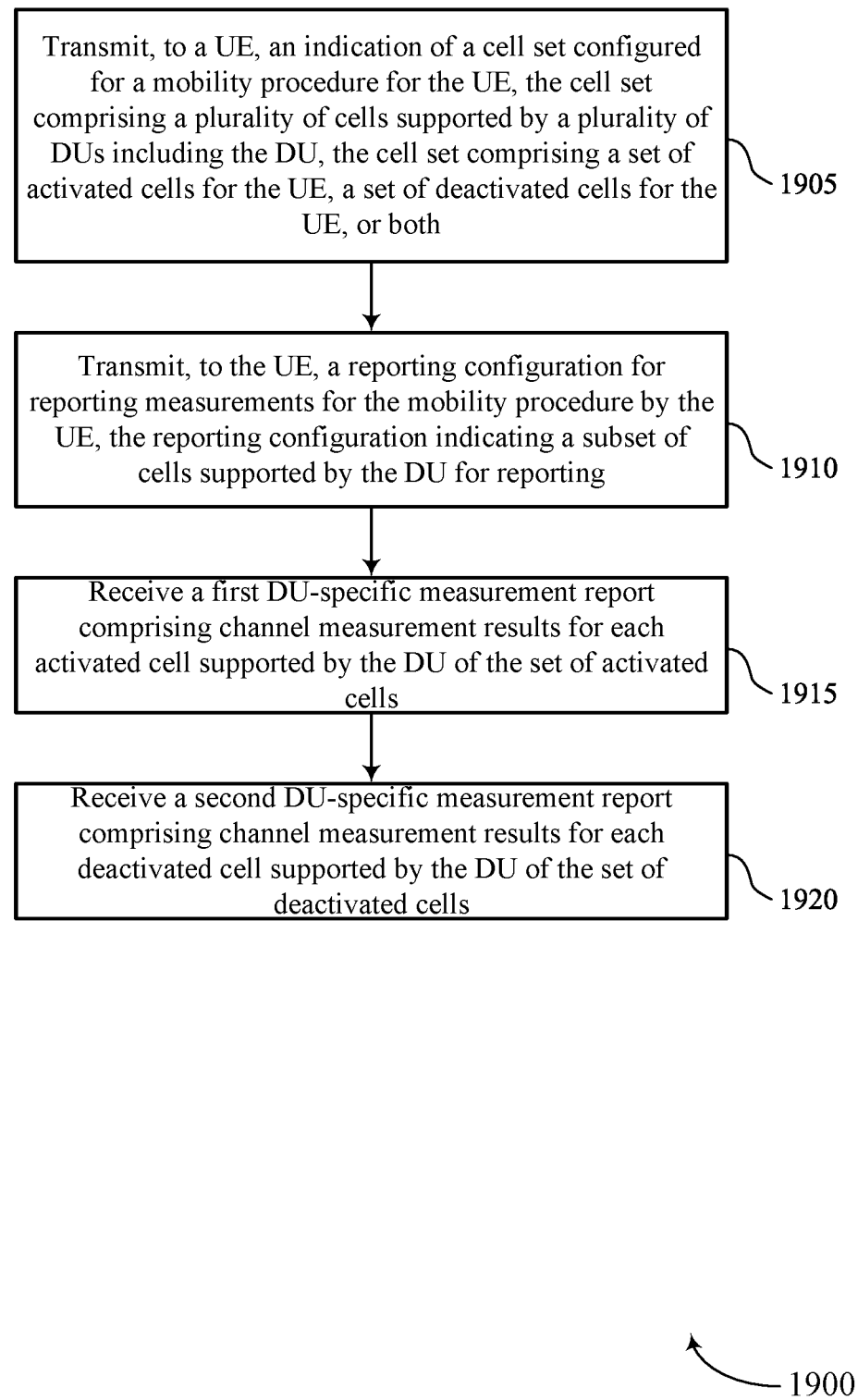

FIG. 19 shows a flowchart illustrating a method 1900 that supports cell measurement and reporting for mobility in distributed wireless communications systems in accordance with aspects of the present disclosure. The operations of the method 1900 may be implemented by a base station or its components as described herein. For example, the operations of the method 1900 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1905, the method may include transmitting, to a UE, an indication of a cell set configured for a mobility procedure for the UE, the cell set including a set of multiple cells supported by a set of multiple DUs including the DU, the cell set including a set of activated cells for the UE, a set of deactivated cells for the UE, or both. The operations of 1905 may be performed in accordance with examples as disclosed herein. In some examples, aspects of the operations of 1905 may be performed by a cell set transmitter 1325 as described with reference to FIG. 13.

At 1910, the method may include transmitting, to the UE, a reporting configuration for reporting measurements for the mobility procedure by the UE, the reporting configuration indicating a subset of cells supported by the DU for reporting. The operations of 1910 may be performed in accordance with examples as disclosed herein. In some examples, aspects of the operations of 1910 may be performed by a configuration transmitter 1330 as described with reference to FIG. 13.

At 1915, the method may include receiving a first DU-specific measurement report including channel measurement results for each activated cell supported by the DU of the set of activated cells. The operations of 1915 may be performed in accordance with examples as disclosed herein. In some examples, aspects of the operations of 1915 may be performed by a report receiver 1335 as described with reference to FIG. 13.

At 1920, the method may include receiving a second DU-specific measurement report including channel measurement results for each deactivated cell supported by the DU of the set of deactivated cells. The operations of 1920 may be performed in accordance with examples as disclosed herein. In some examples, aspects of the operations of 1920 may be performed by a report receiver 1335 as described with reference to FIG. 13.

Figure 20:
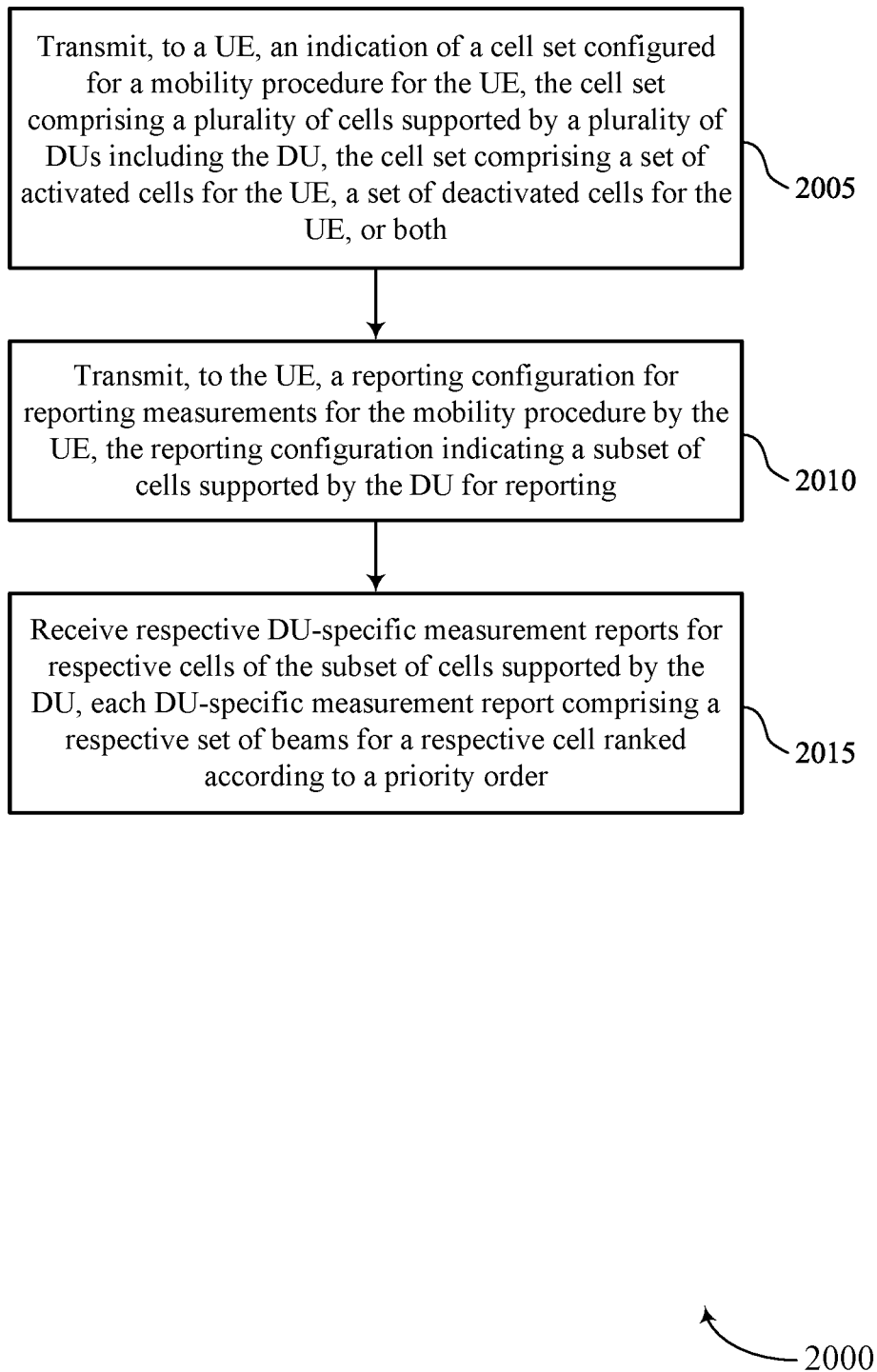

FIG. 20 shows a flowchart illustrating a method 2000 that supports cell measurement and reporting for mobility in distributed wireless communications systems in accordance with aspects of the present disclosure. The operations of the method 2000 may be implemented by a base station or its components as described herein. For example, the operations of the method 2000 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 2005, the method may include transmitting, to a UE, an indication of a cell set configured for a mobility procedure for the UE, the cell set including a set of multiple cells supported by a set of multiple DUs including the DU, the cell set including a set of activated cells for the UE, a set of deactivated cells for the UE, or both. The operations of 2005 may be performed in accordance with examples as disclosed herein. In some examples, aspects of the operations of 2005 may be performed by a cell set transmitter 1325 as described with reference to FIG. 13.

At 2010, the method may include transmitting, to the UE, a reporting configuration for reporting measurements for the mobility procedure by the UE, the reporting configuration indicating a subset of cells supported by the DU for reporting. The operations of 2010 may be performed in accordance with examples as disclosed herein. In some examples, aspects of the operations of 2010 may be performed by a configuration transmitter 1330 as described with reference to FIG. 13.

At 2015, the method may include receiving respective DU-specific measurement reports for respective cells of the subset of cells supported by the DU, each DU-specific measurement report including a respective set of beams for a respective cell ranked according to a priority order. The operations of 2015 may be performed in accordance with examples as disclosed herein. In some examples, aspects of the operations of 2015 may be performed by a report receiver 1335 as described with reference to FIG. 13.

The following provides an overview of aspects of the present disclosure:

Aspect 1: A method for wireless communications at a UE, comprising: receiving an indication of a cell set configured for the UE, the cell set comprising a plurality of cells supported by a plurality of distributed units (DUs) of a base station, wherein the cell set comprises a set of activated cells for the UE, a set of deactivated cells for the UE, or both; performing, as part of a mobility procedure for the UE, channel measurements for a subset of cells of the cell set, wherein each of the subset of cells is supported by a DU of the plurality of DUs; generating a DU-specific measurement report for the DU of the plurality of DUs based at least in part on performing the channel measurements, the DU-specific measurement report consisting of channel measurement results for each of the subset of cells; and transmitting, to the DU of the plurality of DUs, the DU-specific measurement report.

Aspect 2: The method of aspect 1, further comprising: transmitting, to a second DU of the plurality of DUs, a second DU-specific measurement report consisting of channel measurement results for a second subset of cells of the cell set based at least in part on performing the channel measurements, wherein each of the second subset of cells is supported by the second DU.

Aspect 3: The method of any of aspects 1 through 2, wherein transmitting the DU-specific measurement report comprises: transmitting a first DU-specific measurement report to the DU, the first DU-specific measurement report comprising channel measurement results for each activated cell supported by the DU from the set of activated cells; and transmitting a second DU-specific measurement report to the DU, the second DU-specific measurement report comprising channel measurement results for each deactivated cell supported by the DU of the set of deactivated cells.

Aspect 4: The method of any of aspects 1 through 3, further comprising: transmitting respective measurement reports for each cell of the subset of cells, each respective measurement report comprising a respective set of beams for a respective cell ranked according to a priority order.

Aspect 5: The method of any of aspects 1 through 4, wherein transmitting the DU-specific measurement report comprises: transmitting the DU-specific measurement report for a group of activated cells of the set of activated cells, the DU-specific measurement report comprising a set of beams for the group of activated cells ranked according to a priority order across the group of activated cells, a respective set of beams for each cell of the group of activated cells ranked according to a respective priority order for each cell, or both.

Aspect 6: The method of any of aspects 1 through 5, wherein transmitting the DU-specific measurement report comprises: transmitting the DU-specific measurement report for a group of deactivated cells of the set of deactivated cells, the DU-specific measurement report comprising a set of beams for the group of deactivated cells ranked according to a priority order across the group of deactivated cells, a respective set of beams for each cell of the group of deactivated cells ranked according to a respective priority order for each cell, a cell quality parameter for each of the group of deactivated cells, or any combination thereof.

Aspect 7: The method of any of aspects 1 through 6, wherein transmitting the DU-specific measurement report comprises: transmitting a joint DU-specific measurement report to the DU, the joint DU-specific measurement report consisting of channel measurement results for a cell group that includes one or more activated cells supported by the DU from the set of activated cells and one or more deactivated cells supported by the DU from the set of deactivated cells.

Aspect 8: The method of aspect 7, wherein the joint DU-specific measurement report comprises a set of beams for the cell group ranked according to a priority order across the cell group, a respective set of beams for one or more cells of the cell group ranked according to a respective priority order for each of the one or more cells, a cell quality for one or more cells of the cell group, or any combination thereof.

Aspect 9: The method of any of aspects 7 through 8, further comprising: receiving, from the DU, a control message that indicates the cell group for reporting in the joint DU-specific measurement report, wherein the cell group corresponds to a first RRC connection and is different from a second cell group corresponding to a second RRC connection.

Aspect 10: The method of any of aspects 1 through 9, further comprising: receiving, from the DU, a control message that indicates the subset of cells for reporting in the DU-specific measurement report, wherein the subset of cells corresponds to a first RRC connection and is different from a second subset of cells corresponding to a second RRC connection.

Aspect 11: The method of any of aspects 1 through 10, further comprising: receiving, from the DU, a reporting configuration for the DU-specific measurement report, the reporting configuration indicating the subset of cells for reporting, a number of beams for reporting, a number of cells for reporting, a periodicity associated with reporting, a trigger for reporting, or any combination thereof.

Aspect 12: The method of aspect 11, wherein the reporting configuration corresponds to a first type of reporting different from a second configuration that corresponds to a second type of reporting.

Aspect 13: The method of any of aspects 1 through 12, wherein transmitting the DU-specific measurement report comprises: transmitting the DU-specific measurement report using layer 1 (L1) or layer 2 (L2) signaling.

Aspect 14: The method of any of aspects 1 through 13, wherein performing the channel measurements comprises: performing layer 1 (L1) or layer 2 (L2) measurements for each cell of the subset of cells.

Aspect 15: The method of any of aspects 1 through 14, further comprising: performing layer 3 (L3) channel measurements for one or more neighboring cells, wherein the cell set excludes the one or more neighboring cells; transmitting an L3 measurement report including the L3 channel measurements for the one or more neighboring cells; and receiving a configuration message indicating an updated cell set for the UE based at least in part on the L3 measurement report, wherein the updated cell set comprises at least one of the one or more neighboring cells.

Aspect 16: A method for wireless communications at a distributed unit (DU) of a base station, comprising: transmitting, to a UE, an indication of a cell set configured for a mobility procedure for the UE, the cell set comprising a plurality of cells supported by a plurality of DUs including the DU, the cell set comprising a set of activated cells for the UE, a set of deactivated cells for the UE, or both; transmitting, to the UE, a reporting configuration for reporting measurements for the mobility procedure by the UE, the reporting configuration indicating a subset of cells supported by the DU for reporting; and receiving, from the UE, a DU-specific measurement report for the DU that consists of channel measurement results for the subset of cells based at least in part on the reporting configuration.

Aspect 17: The method of aspect 16, wherein receiving the DU-specific measurement report comprises: receiving a first DU-specific measurement report comprising channel measurement results for each activated cell supported by the DU of the set of activated cells; and receiving a second DU-specific measurement report comprising channel measurement results for each deactivated cell supported by the DU of the set of deactivated cells.

Aspect 18: The method of any of aspects 16 through 17, further comprising: receiving respective DU-specific measurement reports for respective cells of the subset of cells supported by the DU, each DU-specific measurement report comprising a respective set of beams for a respective cell ranked according to a priority order.

Aspect 19: The method of any of aspects 16 through 18, wherein receiving the DU-specific measurement report comprises: receiving the DU-specific measurement report for a group of activated cells of the set of activated cells, the DU-specific measurement report comprising a set of beams for the group of activated cells ranked according to a priority order across the group of activated cells, a respective set of beams for each cell of the group of activated cells ranked according to a respective priority order for each cell, or both.

Aspect 20: The method of any of aspects 16 through 19, wherein receiving the DU-specific measurement report comprises: receiving the DU-specific measurement report for a group of deactivated cells of the set of deactivated cells, the DU-specific measurement report comprising a set of beams for the group of deactivated cells ranked according to a priority order across the group of deactivated cells, a respective set of beams for each cell of the group of deactivated cells ranked according to a respective priority order for each cell, a cell quality parameter for each of the group of deactivated cells, or any combination thereof.

Aspect 21: The method of any of aspects 16 through 20, wherein receiving the DU-specific measurement report comprises: receiving a joint DU-specific measurement report from the UE, the joint DU-specific measurement report comprising channel measurement results for a cell group that includes one or more activated cells supported by the DU from the set of activated cells and one or more deactivated cells supported by the DU from the set of deactivated cells.

Aspect 22: The method of aspect 21, wherein the joint DU-specific measurement report comprises a set of beams for the cell group ranked according to a priority order across the cell group, a respective set of beams for one or more cells of the cell group ranked according to a respective priority order for each of the one or more cells, a cell quality for one or more cells of the cell group, or any combination thereof.

Aspect 23: The method of any of aspects 16 through 22, further comprising: transmitting, to the UE, a control message that indicates the subset of cells for reporting in the DU-specific measurement report, wherein the subset of cells corresponds to a first RRC connection and is different from a second subset of cells corresponding to a second RRC connection.

Aspect 24: The method of any of aspects 16 through 23, wherein receiving the DU-specific measurement report comprises: receiving the DU-specific measurement report using layer 1 (L1) or layer 2 (L2) signaling.

Aspect 25: The method of any of aspects 16 through 24, further comprising: receiving, from the UE, a layer 3 (L3) measurement report including a set of L3 channel measurements for one or more neighboring cells of the UE; and transmitting a configuration message to the UE indicating an updated cell set for the UE based at least in part on the L3 measurement report, wherein the updated cell set comprises at least one of the one or more neighboring cells.

Aspect 26: An apparatus for wireless communications at a UE, comprising a processor; memory coupled with the processor; and instructions stored in the memory and executable by the processor to cause the apparatus to perform a method of any of aspects 1 through 15.

Aspect 27: An apparatus for wireless communications at a UE, comprising at least one means for performing a method of any of aspects 1 through 15.

Aspect 28: A non-transitory computer-readable medium storing code for wireless communications at a UE, the code comprising instructions executable by a processor to perform a method of any of aspects 1 through 15.

Aspect 29: An apparatus for wireless communications at a distributed unit (DU) of a base station, comprising a processor; memory coupled with the processor; and instructions stored in the memory and executable by the processor to cause the apparatus to perform a method of any of aspects 16 through 25.

Aspect 30: An apparatus for wireless communications at a distributed unit (DU) of a base station, comprising at least one means for performing a method of any of aspects 16 through 25.

Aspect 31: A non-transitory computer-readable medium storing code for wireless communications at a distributed unit (DU) of a base station, the code comprising instructions executable by a processor to perform a method of any of aspects 16 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving an indication of a cell set configured for the UE, the cell set comprising a plurality of cells supported by a plurality of distributed units (DUs) of a network device, wherein the cell set comprises a set of activated cells for the UE, a set of deactivated cells for the UE, or both;
   performing, as part of a mobility procedure for the UE, channel measurements for a subset of cells of the cell set, wherein each of the subset of cells is supported by a DU of the plurality of DUs;
   generating a DU-specific measurement report for the DU of the plurality of DUs based at least in part on performing the channel measurements, the DU-specific measurement report consisting of channel measurement results for each of the subset of cells; and
   transmitting, using layer 1 (L1) or layer 2 (L2) signaling, the DU-specific measurement report for the DU of the plurality of DUs.

2. The method of claim 1, further comprising:
   transmitting, for a second DU of the plurality of DUs, a second DU-specific measurement report consisting of channel measurement results for a second subset of cells of the cell set based at least in part on performing the channel measurements, wherein each of the second subset of cells is supported by the second DU.

3. The method of claim 1, wherein transmitting the DU-specific measurement report comprises:
   transmitting a first DU-specific measurement report for the DU, the first DU-specific measurement report comprising channel measurement results for each activated cell supported by the DU from the set of activated cells; and
   transmitting a second DU-specific measurement report for the DU, the second DU-specific measurement report comprising channel measurement results for each deactivated cell supported by the DU of the set of deactivated cells.

4. The method of claim 1, further comprising:
   transmitting respective measurement reports for each cell of the subset of cells, each respective measurement report comprising a respective set of beams for a respective cell ranked according to a priority order.

5. The method of claim 1, wherein transmitting the DU-specific measurement report comprises:
   transmitting the DU-specific measurement report for a group of activated cells of the set of activated cells, the DU-specific measurement report comprising a set of beams for the group of activated cells ranked according to a priority order across the group of activated cells, a respective set of beams for each cell of the group of activated cells ranked according to a respective priority order for each cell, or both.

6. The method of claim 1, wherein transmitting the DU-specific measurement report comprises:
   transmitting the DU-specific measurement report for a group of deactivated cells of the set of deactivated cells, the DU-specific measurement report comprising a set of beams for the group of deactivated cells ranked according to a priority order across the group of deactivated cells, a respective set of beams for each cell of the group of deactivated cells ranked according to a respective priority order for each cell, a cell quality parameter for each of the group of deactivated cells, or any combination thereof.

7. The method of claim 1, wherein transmitting the DU-specific measurement report comprises:
   transmitting a joint DU-specific measurement report for the DU, the joint DU-specific measurement report consisting of channel measurement results for a cell group that includes one or more activated cells supported by the DU from the set of activated cells and one or more deactivated cells supported by the DU from the set of deactivated cells.

8. The method of claim 7, wherein the joint DU-specific measurement report comprises a set of beams for the cell group ranked according to a priority order across the cell group, a respective set of beams for one or more cells of the cell group ranked according to a respective priority order for each of the one or more cells, a cell quality for one or more cells of the cell group, or any combination thereof.

9. The method of claim 7, further comprising:
receiving a control message that indicates the cell group for reporting in the joint DU-specific measurement report, wherein the cell group corresponds to a first radio resource control (RRC) connection and is different from a second cell group corresponding to a second RRC connection.

10. The method of claim 1, further comprising:
receiving a control message that indicates the subset of cells for reporting in the DU-specific measurement report, wherein the subset of cells corresponds to a first radio resource control (RRC) connection and is different from a second subset of cells corresponding to a second RRC connection.

11. The method of claim 1, further comprising:
receiving a reporting configuration for the DU-specific measurement report, the reporting configuration indicating the subset of cells for reporting, a quantity of beams for reporting, a quantity of cells for reporting, a periodicity associated with reporting, a trigger for reporting, or any combination thereof.

12. The method of claim 11, wherein the reporting configuration corresponds to a first type of reporting different from a second configuration that corresponds to a second type of reporting.

13. The method of claim 1, wherein performing the channel measurements comprises:
performing L1 or L2 measurements for each cell of the subset of cells.

14. The method of claim 1, further comprising:
performing layer 3 (L3) channel measurements for one or more neighboring cells, wherein the cell set excludes the one or more neighboring cells;
transmitting an L3 measurement report including the L3 channel measurements for the one or more neighboring cells; and
receiving a configuration message indicating an updated cell set for the UE based at least in part on the L3 measurement report, wherein the updated cell set comprises at least one of the one or more neighboring cells.

15. A method for wireless communications at a distributed unit (DU) of a network device, comprising:
transmitting an indication of a cell set configured for a mobility procedure for a user equipment (UE), the cell set comprising a plurality of cells supported by a plurality of DUs including the DU, the cell set comprising a set of activated cells for the UE, a set of deactivated cells for the UE, or both;
transmitting a reporting configuration for reporting measurements for the mobility procedure by the UE, the reporting configuration indicating a subset of cells supported by the DU for reporting; and
receiving, using layer 1 (L1) or layer 2 (L2) signaling, a DU-specific measurement report for the DU that consists of channel measurement results for the subset of cells based at least in part on the reporting configuration.

16. The method of claim 15, wherein receiving the DU-specific measurement report comprises:
receiving a first DU-specific measurement report comprising channel measurement results for each activated cell supported by the DU of the set of activated cells; and
receiving a second DU-specific measurement report comprising channel measurement results for each deactivated cell supported by the DU of the set of deactivated cells.

17. The method of claim 15, further comprising:
receiving respective DU-specific measurement reports for respective cells of the subset of cells supported by the DU, each DU-specific measurement report comprising a respective set of beams for a respective cell ranked according to a priority order.

18. The method of claim 15, wherein receiving the DU-specific measurement report comprises:
receiving the DU-specific measurement report for a group of activated cells of the set of activated cells, the DU-specific measurement report comprising a set of beams for the group of activated cells ranked according to a priority order across the group of activated cells, a respective set of beams for each cell of the group of activated cells ranked according to a respective priority order for each cell, or both.

19. The method of claim 15, wherein receiving the DU-specific measurement report comprises:
receiving the DU-specific measurement report for a group of deactivated cells of the set of deactivated cells, the DU-specific measurement report comprising a set of beams for the group of deactivated cells ranked according to a priority order across the group of deactivated cells, a respective set of beams for each cell of the group of deactivated cells ranked according to a respective priority order for each cell, a cell quality parameter for each of the group of deactivated cells, or any combination thereof.

20. The method of claim 15, wherein receiving the DU-specific measurement report comprises:
receiving a joint DU-specific measurement report, the joint DU-specific measurement report comprising channel measurement results for a cell group that includes one or more activated cells supported by the DU from the set of activated cells and one or more deactivated cells supported by the DU from the set of deactivated cells.

21. The method of claim 20, wherein the joint DU-specific measurement report comprises a set of beams for the cell group ranked according to a priority order across the cell group, a respective set of beams for one or more cells of the cell group ranked according to a respective priority order for each of the one or more cells, a cell quality for one or more cells of the cell group, or any combination thereof.

22. The method of claim 15, further comprising:
transmitting a control message that indicates the subset of cells for reporting in the DU-specific measurement report, wherein the subset of cells corresponds to a first radio resource control (RRC) connection and is different from a second subset of cells corresponding to a second RRC connection.

23. The method of claim 15, further comprising:
receiving a layer 3 (L3) measurement report including a set of L3 channel measurements for one or more neighboring cells of the UE; and
transmitting a configuration message indicating an updated cell set for the UE based at least in part on the L3 measurement report, wherein the updated cell set comprises at least one of the one or more neighboring cells.

24. An apparatus for wireless communications at a user equipment (UE), comprising:
a processor;
memory coupled with the processor; and
instructions stored in the memory and executable by the processor to cause the apparatus to:

receive an indication of a cell set configured for the UE, the cell set comprising a plurality of cells supported by a plurality of distributed units (DUs) of a network device, wherein the cell set comprises a set of activated cells for the UE, a set of deactivated cells for the UE, or both;

perform, as part of a mobility procedure for the UE, channel measurements for a subset of cells of the cell set, wherein each of the subset of cells is supported by a DU of the plurality of DUs;

generate a DU-specific measurement report for the DU of the plurality of DUs based at least in part on performing the channel measurements, the DU-specific measurement report consisting of channel measurement results for each of the subset of cells; and transmit, using layer 1 (L1) or layer 2 (L2) signaling, the DU-specific measurement report for the DU of the plurality of DUs.

25. The apparatus of claim 24, wherein the instructions are further executable by the processor to cause the apparatus to:

transmit, for a second DU of the plurality of DUs, a second DU-specific measurement report consisting of channel measurement results for a second subset of cells of the cell set based at least in part on performing the channel measurements, wherein each of the second subset of cells is supported by the second DU.

26. The apparatus of claim 24, wherein the instructions to transmit the DU-specific measurement report are executable by the processor to cause the apparatus to:

transmit a first DU-specific measurement report for the DU, the first DU-specific measurement report comprising channel measurement results for each activated cell supported by the DU from the set of activated cells; and transmit a second DU-specific measurement report for the DU, the second DU-specific measurement report comprising channel measurement results for each deactivated cell supported by the DU of the set of deactivated cells.

27. An apparatus for wireless communications at a distributed unit (DU) of a network device, comprising:

a processor;

memory coupled with the processor; and instructions stored in the memory and executable by the processor to cause the apparatus to:

transmit an indication of a cell set configured for a mobility procedure for a user equipment (UE), the cell set comprising a plurality of cells supported by a plurality of DUs including the DU, the cell set comprising a set of activated cells for the UE, a set of deactivated cells for the UE, or both;

transmit a reporting configuration for reporting measurements for the mobility procedure by the UE, the reporting configuration indicating a subset of cells supported by the DU for reporting; and receive, using layer 1 (L1) or layer 2 (L2) signaling, a DU-specific measurement report for the DU that consists of channel measurement results for the subset of cells based at least in part on the reporting configuration.

28. The apparatus of claim 27, wherein the instructions to receive the DU-specific measurement report are executable by the processor to cause the apparatus to:

receive a first DU-specific measurement report comprising channel measurement results for each activated cell supported by the DU of the set of activated cells; and receive a second DU-specific measurement report comprising channel measurement results for each deactivated cell supported by the DU of the set of deactivated cells.

* * * * *